(12) United States Patent  
Bourgeau et al.

(10) Patent No.: US 7,933,101 B2  
(45) Date of Patent: Apr. 26, 2011

(54) GENERATOR POWER PLANT PROTECTION SYSTEM AND METHOD

(75) Inventors: Edward Peter Kenneth Bourgeau, Houston, TX (US); Jason Conrad Aspin, Owen Sound (CA); Alan Woodford, Owen Sound (CA)

(73) Assignees: AKA Information Design, Owen Sound, Ontario (CA); Edward Peter Kenneth Bourgeau, Houston, TX (US)

( * ) Notice: Subject to any disclaimer, the term of this patent is extended or adjusted under 35 U.S.C. 154(b) by 258 days.

(21) Appl. No.: 12/032,470

(22) Filed: Feb. 15, 2008

(65) Prior Publication Data

US 2008/0290666 A1 Nov. 27, 2008

Related U.S. Application Data

(60) Provisional application No. 60/901,312, filed on Feb. 15, 2007.

(51) Int. Cl.
 *H02H 7/06* (2006.01)
(52) U.S. Cl. ........................................................ 361/21
(58) Field of Classification Search .................... 361/21
 See application file for complete search history.

(56) References Cited

U.S. PATENT DOCUMENTS

| | | | |
|---|---|---|---|
| 3,798,524 A | 3/1974 | Okamoto et al. | |
| 4,032,793 A | 6/1977 | Uram | |
| 4,349,744 A * | 9/1982 | Reuther et al. | 290/40 C |
| 4,470,257 A | 9/1984 | Wescott | |
| 5,715,124 A | 2/1998 | Votova et al. | |
| 5,761,895 A | 6/1998 | Chu et al. | |
| 6,118,187 A * | 9/2000 | Hepner et al. | 290/40 B |
| 6,252,753 B1 * | 6/2001 | Bhargava | 361/62 |
| 6,338,009 B1 | 1/2002 | Sato et al. | |
| 6,439,348 B2 * | 8/2002 | Tajima et al. | 187/290 |
| 7,015,677 B2 | 3/2006 | Kawabata | |

(Continued)

FOREIGN PATENT DOCUMENTS

WO WO 2006/126003 A1 11/2006

OTHER PUBLICATIONS

Arcidiacono, V. et al., "Integrated Voltage and Reactive Power Control for All Electric Ship Power Systems," *International Symposium on Power Electronics, Electrical Drivers, Automation and Motion*, pp. S31-61-S31-65 (2006).

(Continued)

*Primary Examiner* — Ronald W Leja
*Assistant Examiner* — Ann T Hoang
(74) *Attorney, Agent, or Firm* — Merchant & Gould P.C.

(57) ABSTRACT

A typical power plant has a plurality of generators; at least one load; at least one bus interconnecting the generators and the at least one load. The plant is operated on an uncorrected droop configuration for speed control and voltage control. The plant further includes a monitoring module for monitoring at least one of a plurality of signals; a calculating module for calculating a fault based on a comparison of predefined values expected from normal droop operation with respect to monitored values obtained from the monitored signals; and a control module for providing an order to bring additional generating capacity on line, for tripping a generator if a fault has been identified with respect to a single generator or for tripping a tie breaker to provide bus to bus isolation if an identified fault cannot be isolated to a single generator.

9 Claims, 11 Drawing Sheets

U.S. PATENT DOCUMENTS

| | | | |
|---|---|---|---|
| 7,290,525 | B1 | 11/2007 | Kapsokavathis et al. |
| 7,453,674 | B2 * | 11/2008 | Kuehnle et al. ............... 361/20 |
| 2005/0033480 | A1 * | 2/2005 | Schlueter et al. ............ 700/286 |
| 2007/0274114 | A1 | 11/2007 | Neacsu |

OTHER PUBLICATIONS

De Brabandere, K. et al., "A voltage and frequency droop control method for parallel inverters," *IEEE 35th Annual Power Electronics Specialists Conference*, vol. 4, pp. 2501-2507 (2004) (1 page abstract).

Mitra, D. et al., "Test pattern generation for power supply droop faults," *19th International Conference on VLSI Design—held jointly with 5th International Conference on Embedded Systems a Design*, 6 pages (Jan. 3-7, 2006) (1 page abstract).

Patel, S. et al., "Performance of Generator Protection During Major System Disturbances," *IEEE Transactions on Power Delivery*, vol. 19, No. 4, pp. 1650-1662 (Oct. 2004).

"Series 3 Plus Speed Controller for Steam Turbines," *Compressor Controls Corporation*, 2 pages (Mar. 2000).

"Speed Droop and Power Generation," *Woodward Governor Company*, Application Note 01302, pp. 1-7 (1991).

Wright, R. et al., "Understanding modern generator control," *IEEE Transaction on Energy Conversion*, vol. 4, No. 3, pp. 453-458 (Sep. 1989) (1 page abstract).

* cited by examiner

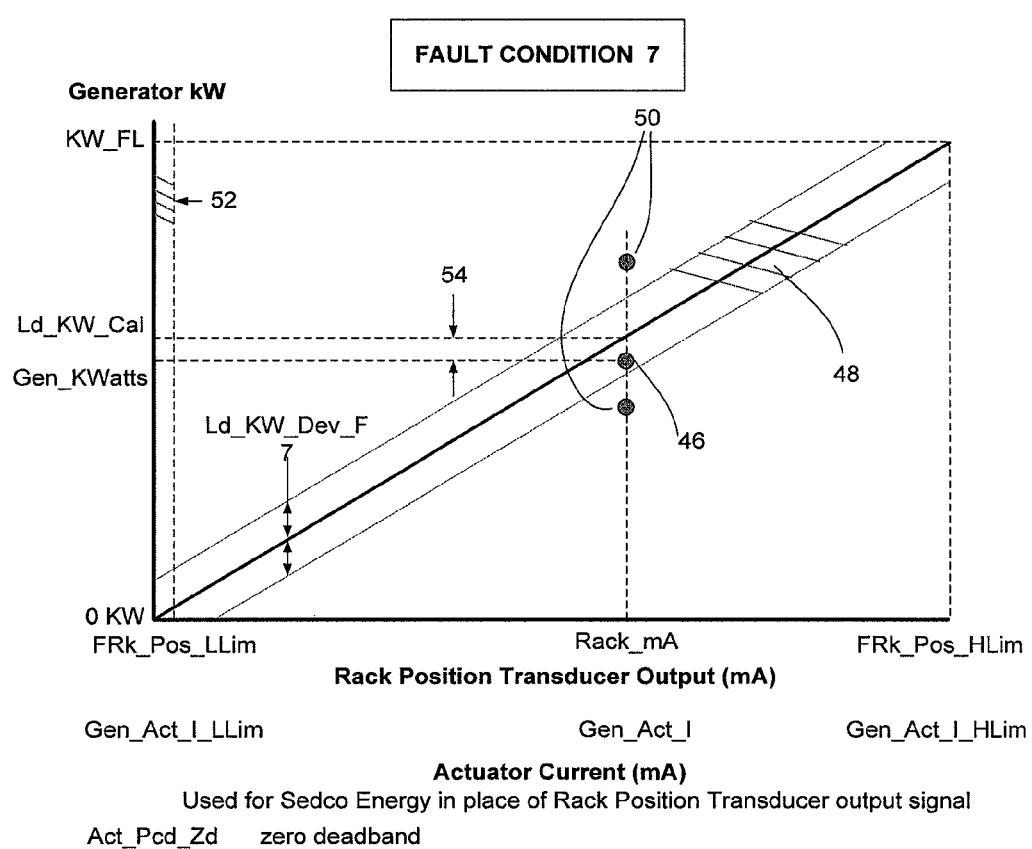

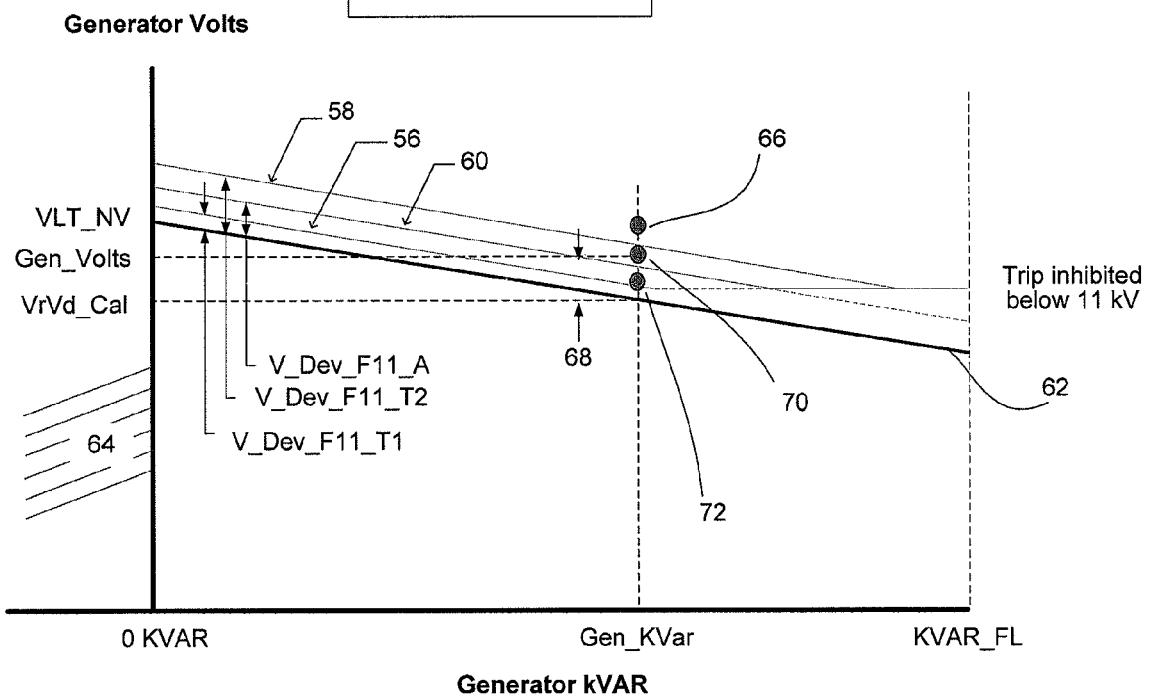

GENERATOR POWER PLANT PROTECTION SYSTEM AND METHOD

FIELD OF THE INVENTION

The present invention generally relates to plant control and protection and more particularly concerns a generator power plant protection system and an associated method based on droop control to increase plant reliability.

BACKGROUND OF THE INVENTION

Typical power plants generally run in an isochronous or droop corrected configuration with the frequency and voltage corrected and maintained at the rated values. This is carried out through correction of any deviation from the rated setting either by a supervisory system or inherently through a compensation system. In addition, typical systems have functions designed to correct for real and reactive load sharing deviations between generator sets operating in parallel.

However, a control system for a plant operating in a typical droop corrected configuration will not be able to discriminate between healthy and unhealthy generators—in fact, such control systems are sometimes unable to correct a fault, resulting in shutdown of the plant.

SUMMARY OF THE INVENTION

An object of the present invention is to provide an improved plant protection method allowing an increase in plant protection and reliability.

The method is advantageously based on the constant monitoring and analysing of the speed and voltage operating conditions of each generator of the plant for detecting faulty conditions and preventing the faults from propagating through the plant and possibly causing a blackout.

More particularly, in the present method, a generator speed control for controlling the speed of the generators of the system will run in droop mode. When droop and no-load speed are set the same on all the generators, also called diesels, units that are electrically or mechanically tied together will inherently share the load equally. Consistent droop will result in a predictable speed for a given load on a generator based on a droop curve, the health of the connected diesel, and the speed control system. A deviation from this curve beyond an acceptable window is indicative of an unhealthy status in the diesel. For example, the diesel is unable to deliver the required power (KW), there is a problem with the speed control system or its control parameters.

Similarly, in the present method, a generator voltage control for controlling the voltage of the generators of the system will run in droop mode. When droop and no-load voltage are set the same on all the generators, units that are electrically tied together will inherently share the reactive current and therefore KVAR equally. Consistent voltage droop will result in a predictable voltage for a given KVAR load on a generator based on a droop curve, the health of the connected diesel, and the voltage control system. A deviation from this curve beyond an acceptable window is indicative of an unhealthy status in the generator. For example, the diesel is unable to deliver the required KVAR, there is a problem with the voltage control system or its control parameters.

An other object of the present invention is to provide an improved plant protection system allowing an increase in plant protection and reliability.

Contrary to the typical systems known in the art, the system of the present invention, by design, advantageously does not correct for speed or voltage droop as a result of the application of real or reactive power. Rather, the system advantageously relies on the engineering control method of droop particularly configured within speed and voltage controllers to carry out the following primary functions:

Identify deviations from normal droop operation of a generator or prime mover which indicate an unhealthy condition; and Control intelligent loads to prevent load-induced stress or power system failure.

By utilizing this method and system on the power generation portion of the plant, the severity of a problem can advantageously be quantified, and an unhealthy condition can then be acted on, prior to it having a negative influence on the rest of the electrical or mechanical network.

For a speed controller, the system advantageously utilizes the pre-programmed constants for rated power and droop, and compares the real time variables for speed and power to the expected values calculated from the pre-programmed droop curve. Deviations from the expected values can then be acted on based on the severity and significance of the fault as programmed within algorithms in the system.

For a voltage controller, the system advantageously utilizes the pre-programmed constants for rated reactive power (or current) and droop, and compares the real time variables for voltage and reactive power (or current) to the expected values calculated from the pre-programmed droop curve. Deviations from the expected values can then be acted on based on the severity and significance of the fault as established by the algorithms programmed in the system.

Advantageously, the method of the present invention provides a proactive approach to system protection and is designed to supply a protection layer over and above the typical reactive generator and prime mover protection systems.

Examples of proactive responses to a detected fault(s) include the following:

Start-up and application of additional generating capacity in anticipation of potential loss of current, online capacity;

Removal of the faulted generator from the network (typically done by tripping the circuit breaker);

Removal of the generator from the network and shutdown of the prime mover;

Isolation of the network from other networks (relevant in the case of redundant bus systems) to provide fault isolation and mitigation;

Alarm notification to the supervisory system(s) for operator notification and event logging.

Moreover, uncorrected or uncompensated operation in droop for the power plant allows the method to provide further system protection and reliability. This is achieved by advantageously allowing intelligent loads to have an inherent understanding of the plant load and stress level through their connection to the associated network. Typical plant arrangements do not provide this ability due to the fact that speed and voltage droop are typically corrected when the supervisory system sees a deviation.

The method advantageously provides a proactive approach to power management, in the most effective control method possible, by allowing the control to be carried out at the lowest control layer possible; at the load itself. Loads are programmed with the defined window for frequency and voltage for the system. As bus conditions approach the boundaries of either of these windows, intelligent loads can respond proactively. They can be programmed to reduce their contribution to the network trend by increasing or decreasing real or reactive power as applicable to assist in correction of the network condition stress.

Examples of load responses to detected bus stress include the following:

Reduction in power consumption through internal control algorithms defined by the process resulting in a corresponding reduction in machine output;

Reduction in regenerated power applied to the bus to provide correction when conditions are approaching the upper limit of the load droop curve;

Measurement of the percentage of real and reactive load by reactive load compensation equipment to allow correction and system operation at optimal levels.

The primary objective of the intelligent load control is to allow the plant to ride through transient conditions without pushing the bus beyond acceptable operating conditions. Short duration transients or excursions of minimal amplitude do not require load reaction. The process is designed to allow the plant to correct for system stressors that could result in full or partial failure of the plant's ability to continue providing reliable power. This could occur as a result of overload or over running of the connected generators. The intelligent loads provide short term power management through load control. The duration of accepted interference of the specific plant process to control load beyond the primary commanded control is dependent on the process and for some equipment may not be permitted at all. The process actions are of short duration and allow ride-through until supervisory power management functions can adjust the plant configuration to allow proper operation within acceptable windows without interference at the load level. While the control algorithms to carry out load adjustment for this process are advantageously relatively simple, the process requires significant design and coordination between loads and the supervisory system to be successful and to prevent harmonic interaction between independent controllers. Depending on the plant, this process can contain several operationally dependent configurations or only a few. This process may be defined in a separate controller or simply through a document control matrix defining the control characteristics for each intelligent load with respect to the present process.

Thus, in accordance with one aspect of the present invention there is provided a power plant comprising:
 a plurality of generators;
 at least one load;
 at least one bus interconnecting said generators with said at least one load;
 said plant being operated on an uncorrected droop configuration for speed control and voltage control;
 wherein:
  said plant further includes a monitoring module for monitoring at least one of a plurality of signals; a calculating module for calculating a fault based on a comparison of predefined values expected from normal droop operation with respect to monitored values obtained from said monitored signals; and a control module for providing an order to bring additional generating capacity on line, for tripping a generator if a fault has been identified with respect to a single generator or for tripping a tie breaker to provide bus to bus isolation if an identified fault cannot be isolated to a single generator.

In accordance with another aspect of the invention, there is provided a power plant comprising:
 a plurality of generators;
 at least one load;
 at least one bus interconnecting said generators with said at least one load;
 said plant being operated on an uncorrected droop configuration for speed control and voltage control;
 wherein at least one of said loads is further provided with a monitoring apparatus, said monitoring apparatus being operatively connected with said at least one load and operatively connected to said at least one bus, said monitoring apparatus monitoring frequency and voltage on said at least one bus and comparing said monitored frequency and voltage with predetermined levels expected from normal droop operation, and for modifying a contribution of said load to said plant as monitored frequency or voltage or a combination thereof approach boundary conditions for either of frequency and voltage.

Yet another aspect of the invention concerns a method for controlling the operation of a power plant comprising a plurality of generators; at least one load; at least one bus interconnecting said generators with said at least one load;
 wherein said method comprises the steps of:
 operating said plant in an uncorrected droop configuration for speed control and voltage control;
 monitoring at least one of a plurality of signals;
 calculating a fault based on a comparison of predefined values expected from normal droop operation with respect to monitored values obtained from said monitored signals; and
 providing an order to bring additional generating capacity on line, for tripping a generator if a fault has been identified with respect to a single generator or for tripping a tie breaker to provide bus to bus isolation if an identified fault cannot be isolated to a single generator.

These and other objects and advantages of the invention will become apparent upon reading the following detailed description. While the invention will be described in conjunction with example embodiments, it will be understood that it is not intended to limit the scope of the invention to such embodiments. On the contrary, it is intended to cover all alternatives, modifications and equivalents as may be included as defined by the present description.

BRIEF DESCRIPTION OF THE FIGURES

The present invention will be better understood with the following description of preferred embodiments thereof, made in reference to the following drawings in which:

FIG. 6 is a graph of load versus speed showing the conditions for fault condition 7;

FIG. 7A is a graph of load versus speed showing the conditions for fault condition 11;

DESCRIPTION OF PREFERRED EMBODIMENTS OF THE INVENTION

The present invention utilizes droop control in a non-typical configuration, combined with modern digital control equipment, providing the following:

- ability to identify and clear speed or voltage control failures on generators;
- intelligent loads with the ability to carry out independent power management functions to increase plant reliability
- control elements throughout the plant with the ability to determine percent load on a network through monitoring of voltage and frequency and to calculate the healthy KVAR and KW values for on line generators.

Typical power plants run in an isochronous or droop corrected configuration with the frequency and voltage corrected and maintained at the rated values. This is carried out through correction of any deviation from the rated setting either by a supervisory system or inherently through a compensation system. In addition, typical systems have functions designed to correct for real and reactive load sharing deviations between generator sets operating in parallel. The specific design of these systems will not be expanded on further within this description as they are well known in the art. One of the differences between the present system and method and typical industrial systems is that the present system and method, by design does not correct for speed or voltage droop as a result of the application of real or reactive power. More specifically, in accordance with the invention, the plant is allowed to operate in uncorrected droop configuration. A monitoring unit monitors real-time values and compares these values to expected values for normal plant operation. If the values stray from the expected values, then the control system can analyze the issue and take corrective action.

The invention utilizes the engineering control method of droop configured within speed and voltage controllers to carry out the following primary functions:

- Identify deviations from normal droop operation of a generator or prime mover which indicate an unhealthy condition;
- Control intelligent loads to prevent load-induced stress or power system failure and
- Through understanding of the droop curve and the corresponding KVAR and KW values identify if alternate measurement devices within the system have any out of tolerance readings.

Figure 9:
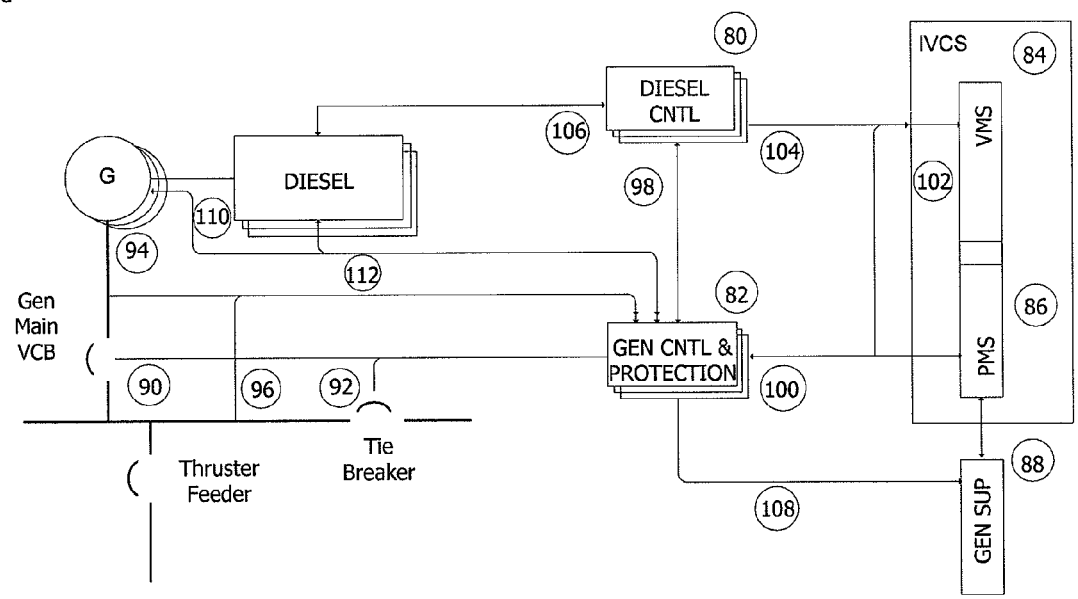
FIG. 9 is a schematic block diagram of the various components of the power plant according to a preferred embodiment of the invention.
Figure 10:
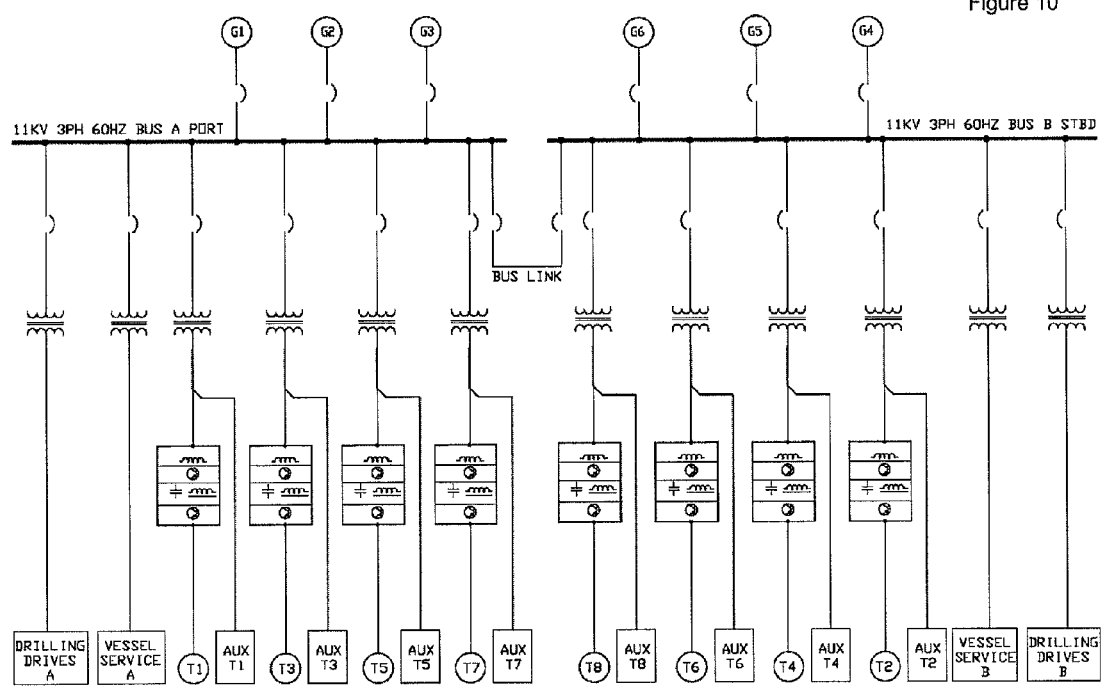
FIG. 10 is a schematic representation of a typical DP2 Power and Propulsion plant arrangement.

The present invention will thus be described in reference for FIGS. 1-10. FIGS. 1-8 illustrate the identification of the various faults identified herein, and FIG. 10 is a schematic block diagram of a typical power plant in which the present invention can be used.

Generator and Prime Mover Protection

By utilizing the invention on the power generation portion of the plant, the severity of a problem can be quantified, and an unhealthy condition can be acted on, prior to it having a negative influence on the rest of the electrical or mechanical network.

For a speed controller, the invention utilizes the pre-programmed constants for rated power and droop, and compares the real time variables for speed and power to the expected values calculated from the pre-programmed droop curve. Deviations from the expected values can then be acted on based on the severity and significance of the fault.

For a voltage controller, the invention utilizes the pre-programmed constants for rated reactive power (or current) and droop and compares the real time variables for voltage and reactive power (or current) to the expected values calculated from the pre-programmed droop curve. Deviations from the expected values can then be acted on based on the severity and significance of the fault.

The invention provides a proactive approach to system protection and is designed to supply a protection layer over and above the typical reactive generator and prime mover protection systems.

Examples of proactive responses to a detected fault(s) include the following

- Start-up and application of additional generating capacity in anticipation of potential loss of current, online capacity;
- Removal of the faulted generator from the network (typically done by tripping the circuit breaker);
- Removal of the generator from the network and shutdown of the prime mover;
- Isolation of the network from other networks (relevant in the case of redundant bus systems) to provide fault isolation and mitigation;
- Alarm notification to the supervisory system(s) for operator notification and event logging.

Intelligent Load Controlled Network Protection

Uncorrected or compensated operation in droop for the power plant allows the invention to provide further system protection and reliability. This is achieved by allowing intelligent loads to have an inherent understanding of the plant load and stress level through their connection to the associated network. Typical plant arrangements do not provide this ability due to the fact that speed and voltage droop are typically corrected when the supervisory system sees a deviation.

The invention provides a proactive approach to power management, in the most effective control method possible, by allowing the control to be carried out at the lowest control layer possible; at the load itself. Loads are programmed with the defined window for frequency and voltage for the system. As bus conditions approach the boundaries of either of these windows, intelligent loads can respond proactively. They can be programmed to reduce their contribution to the network trend by increasing or decreasing real or reactive power as applicable to assist in correction of the network condition stress.

Examples of load responses to detected bus stress include the following:

- Reduction in power consumption through internal control algorithms defined by the Process resulting in a corresponding reduction in machine output.
- Reduction in regenerated power applied to the bus to provide correction when conditions are approaching the upper limit of the load droop curve.
- Measurement of the percentage of real and reactive load by reactive load compensation equipment to allow correction and system operation at optimal levels.

The primary objective of the intelligent load control is to allow the plant to ride through transient conditions without pushing the bus beyond acceptable operating conditions. Short duration transients or excursions of minimal amplitude do not require load reaction. The present invention allows the plant to correct for system stressors that could result in full or partial failure of the plant's ability to continue providing reliable power. This could occur as a result of overload or over running of the connected generators. The intelligent loads provide short term power management through load control. The duration of accepted interference of the specific plant process to control load beyond the primary commanded control is dependent on the process and for some equipment may not be permitted at all. The actions are of short duration and allow ride-through until supervisory power management functions can adjust the plant configuration to allow proper operation within acceptable windows without interference at the load level.

While the control algorithms to carry out load adjustment for this process are relatively simple, the invention requires significant design and coordination between loads and the supervisory system to be successful and to prevent harmonic interaction between independent controllers. Depending on the plant, this process can contain several operationally dependent configurations or only a few. This process may be defined in a separate controller or simply through a document control matrix defining the control characteristics for each intelligent load with respect to this process. However, this again falls within the purview of a person skilled in the art.

Calculation of Individual and Combined KW or KVAR

Understanding of droop curve for speed and voltage control allows a control system to develop monitoring algorithms to determine total plant load as a percentage total load, the total load the plant in KW and KVAR through knowledge of each of the generator ratings and the status of the generator (on-line or off-line) and to determine the health of other portions of the plant that determine total or individual KW or KVAR.

Summary

The following functional description provides details of how the system and method of the present invention can be applied to an installation. It is important to note that the process is configured to the requirements of a specific installation and as such will vary accordingly from system to system.

The present functional description is specific to an upgraded Sedco 700 class Semi-submersible DP Oil Exploration Platform. The system utilizes a two bus system and is classed DP2. However, it will be appreciated by a person skilled in the art that the system and method of the invention can, with appropriate modifications, be applied to other types of plants.

Power Plant Protection Process Definition

General

This functional description defines the requirements for implementing this process in a PLC system—hereafter referred to as the Generator Protection PLC and for applying the process to other discrete controllers within the plant. The PLC provides enhanced generator protection features beyond those available from the existing protection relays required by Class and code. Additional control and power management functions that are provided by the system are also defined, as well as the general functionality of the SWBD generator controls.

The PLC system is designed to identify critical control faults in the generator speed and voltage control systems that are not picked up through the typical generator protection scheme. On detection of such a fault the system will trip the generator before the fault results in a cascade failure and possible black out, or in the event that the fault can not be isolated to a single generator, the system will trip the Tie Breaker to provide bus to bus isolation and prevent further degradation of the condition from affecting both buses.

The system monitors one of more of the following signals in order to achieve this:
Generator voltage (from 489 relay)
Generator frequency (from 489 relay)
Generator Kilowatts (from 489 relay)
Generator Kilovars (from 489 relay)
Generator breaker status (from 489 relay)
Generator field current (from shunt on AVR output)
Generator governor actuator current (from 4-20 mA signal proportional to actuator output current available on the Woodward 2301D governor)
Diesel fuel rack position (from existing rack position transmitter, where available)
SPM-D, 2301D and DECS Alarm Conditions The system is designed so that failure of a feedback or monitoring device within in the system is detected and announced but does not result in a tripping of the associated generator.

Generator Speed Control Fault Monitoring

Key variables that will be utilized within the PLC algorithm to determine health of the generator with respect to speed control are:
Breaker Status
Gen Frequency
Generator KW Purpose Constantly analyze the operating conditions of the generator and apply the speed control fault detection algorithms to detect faults in the monitored generator or conditions that indicate another on-line generator is faulty, and take action to prevent these faults from propagating through the plant and possibly causing a blackout. The action may be to remove the generator from the bus, or to open a tie breaker so as to limit the potential power out age to just one of the main buses.

User Interface

Alarm and trip conditions are latched and need to be reset through the user interface. It is also possible to reset alarms from a push button indicator mounted on the generator cabinet.

Process

The generator speed control for the system will run in droop mode. When droop and no-load speed are set the same on all the diesels, units that are electrically or mechanically tied together will inherently share the load equally. Consistent droop will result in a predictable speed for a given load on a generator based on a droop curve, the health of the connected diesel, and the speed control system. A deviation from this curve beyond an acceptable window is indicative of an unhealthy status in the diesel (unable to deliver the required KW), a problem with the speed control system or its control parameters.

All functions are disabled when the generator breaker is open. The system is to be designed so that breaker status signal is NO (Normally Open). Loss of the signal will be represented as the generator being off-line and therefore all trip and generator alarm functions will be disabled. This would then trigger an alarm on the system if the generator was actually still on line.

All functions will be disabled for 15 seconds following generator breaker closure to allow the generator to take on its share of the load.

Following tripping of the generator breaking by the PLC as a result of any of the fault conditions listed below, the PLC system will prevent the VMS system from restarting the generator. If the Multilin Relay trips the generator breaker within 2 minutes of a previous trip where the current has been greater than a threshold value I_Trip_Thr, then the PLC will prevent the VMS system from restarting the generator. In both cases, normal VMS start-generator action will be restored after the reset button on the generator panel has been pressed.

Fault Condition 1—Low Frequency and Low KW

These symptoms occur if there is a loss of engine power, such as from a sticking injector, fuel pump, dirty fuel filter, incorrectly set ballhead governor or limited fuel rack linkage movement. The power generated is below the level expected for the running speed—as determined from the established normal speed-load droop curve for the engine, e.g. if the bus frequency is 60 Hz (mid point on the speed curve and therefore mid-point on the load curve if 60 Hz is used as the nominal frequency) and the generator has less than 50% of full load. The other engines on-line are generating more power than they would have to if all generators were sharing equally, therefore the speed is slightly lower than would be expected for normal operation with that load.

When this speed deviation is observed to exceed a preset allowable amount, and this deviation is maintained for at least a programmed time delay period, an alarm will be generated and a 'Start-skid' command will be issued to the VMS. If the condition deteriorates to a point where the KW signal on the generator is negative and the diesel is being driven by the bus, and the trend is maintained (no evidence of kW recovery), then the system trips the generator after a programmed time delay.

Figure 1:
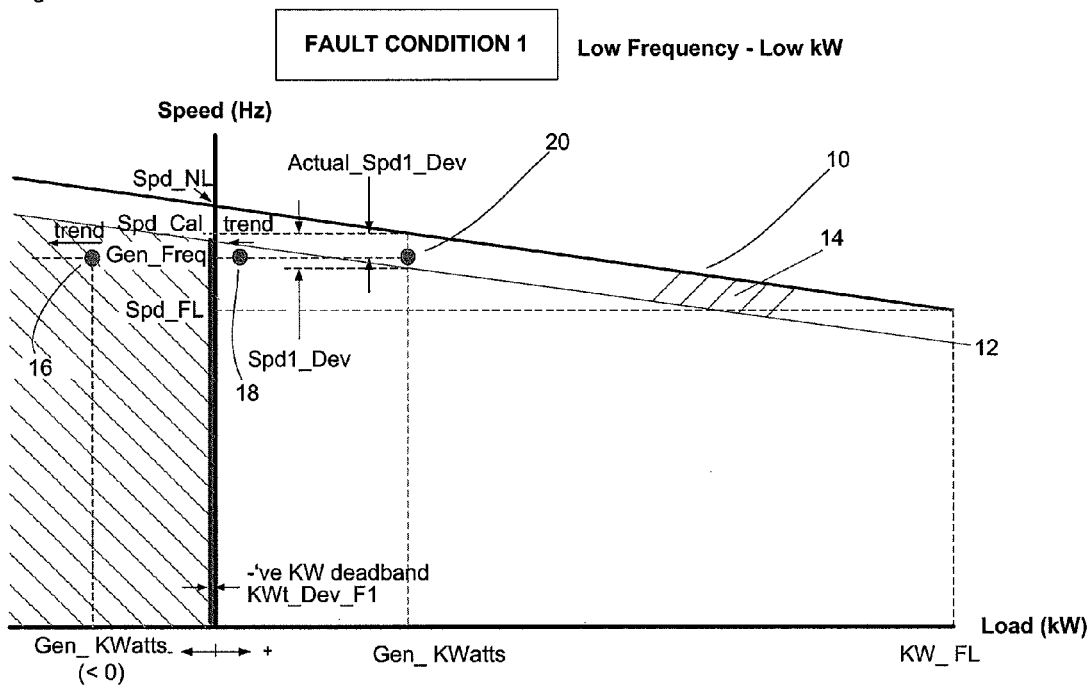
FIG. 1 is a graph of load versus speed identifying the conditions for fault condition 1.

Fault Condition 1, wherein a generator is not developing the required power, is illustrated in FIG. 1. An operating line 10 and a limit 12 of allowable deviation are illustrated. Ideally, all operating points should be on the line 10, however a window 14 is provided between the operating line 10 and the limit 12. A motoring operating point 16 is illustrated having a negative kW wherein an alarm, start-skid command and generator will trip if it remains in this zone for TD_Flt_1T seconds without any kW recovery. A second operating point 18 is outside the set of allowable deviation window 14 and will cause an alarm and a start-skid command if maintained for TD_Flt_1A seconds without any kW recovery. A third operating point 20 is off the operating line 10, so the generator or controls are faulty, or the control is misadjusted. However, the third operating point 20 is within the window 14, so no trip or alarm.

Related Process Variables and Settings - Fault Condition 1

| Variable Name | Description | Source | Type |
|---|---|---|---|
| KW_Xdr | Generator KWs transducer | 489 | AI |
| Load_KW | Generator KW | Int | Derived Value |
| Load_Cal | Percent of full load = (Load_KW/KW_FL) * 100 | Int | Derived Value |
| Freq_Xdr | Generator Frequency transducer | 489 | AI |
| Spd_Hz | Generator frequency | Int | Derived value from Freq_Xdr |
| Brk_St | Breaker status - dry contact from interposing relay | VCB | DI |
| Spd_Cal | Calculated Hz based on droop curve = Spd_NL − (Spd_NL − Spd_FL) * Load_Cal | Int | Derived Value, DB |
| Spd_NL | No load speed in Hz. Setting from tests. | Int | DB |
| Spd_FL | Full load speed in Hz. Setting from tests. | Int | DB |
| KW_FL | Full load KW. | Int | DB |
| Load_Neg | True if Load_KW < 0 | Int | Derived Value |
| Spd1_Dev | Allowable deviation from curve, expressed in Hz and compared to calculated Hz from droop curve | Int | DB |
| Fault_1A | Alarm bit for fault condition 1 - signal stays on for 5 sec and then resets. Alarm remains active in the HMI until it is acknowledged. This is visible on the appropriate the HMI screen. | Int | DB |
| Fault_1T | Trip condition for generator, sends breaker trip to 489 via interposing relay, this signal latches and resets when the breaker is not closed. | Int | Derived Value, DO and DB |
| Fault_1L | This bit latches when SpdFlt1L is active and resets when the operator resets the trips and alarms (ResetGx). This is visible on the appropriate the HMI screen. | Int | Derived Value, DO and DB |
| Spd_Dev_F1 | Amount by which speed may decrease below the no-load speed Spd_NL before it is considered significant - Hz | Int | DO |
| KW_Dev_F1 | Amount by which KW may go negative before it is considered significant - KW | Int | DO |
| Reset_Gx | Reset for alarm and trip conditions on G1 from the HMI or HW | HMI | Bit |
| TD_Flt_1A | Time the fault condition has to be maintained before Fault_1A is annunciated. | Int | DB |
| TD_Flt_1T | Time the fault condition has to be maintained before Fault_1T is set. | Int | DB |

Fault Condition 2—High Frequency and High KW

These symptoms occur if the speed controller has lost its speed feedback and acts as if the speed is low; or the actuator signal has been lost in the case of a reverse acting actuator (where zero actuator current signal represents a max fuel setting command); or any other control fault occurs that causes more fuel to be supplied to the diesel than is required to provide its share of power. It results in the diesel delivering more power to the bus than is associated with the speed load curve of a healthy diesel. For example, if the bus frequency is 60 Hz (mid point on the speed curve and therefore mid-point on the load curve if 60 Hz is used as the nominal frequency) and the generator has significantly more than 50% of full load, then this is an indication of a problem.

Because the engine is delivering more than its share of the power, the other on-line engine(s) are offloaded, resulting in an increase in Hz compared with what would be experienced if all the engines were sharing the load equally.

When the speed deviation is observed to exceed a preset allowable amount, and the deviation is maintained for at least a programmed time delay period, the system will generate an alarm and send a 'Start-skid' order to VMS. If this condition is maintained for at least the programmed time delay period, then the generator breaker will also be tripped.

The function contains load and frequency thresholds that are adjusted in accordance with the specifics of the plant—i.e. generator sizes, ability to overrun other generators, etc. The thresholds are then adjusted so that a generator is kept on line even if is off of its droop curve but still contributing useful KW to the bus and not imposing additional stress on the bus (frequency has not approached no load frequency).

Note: In the event of a ballhead backup configuration where the ballhead governor is active, the curve will be higher with a combination of ballhead and electronic controlled skids or all ballhead control. It is imperative that the trip curve is above the highest possible ballhead curve (all skids in ballhead mode—final configuration of this setting will require testing on site).

Figure 2:
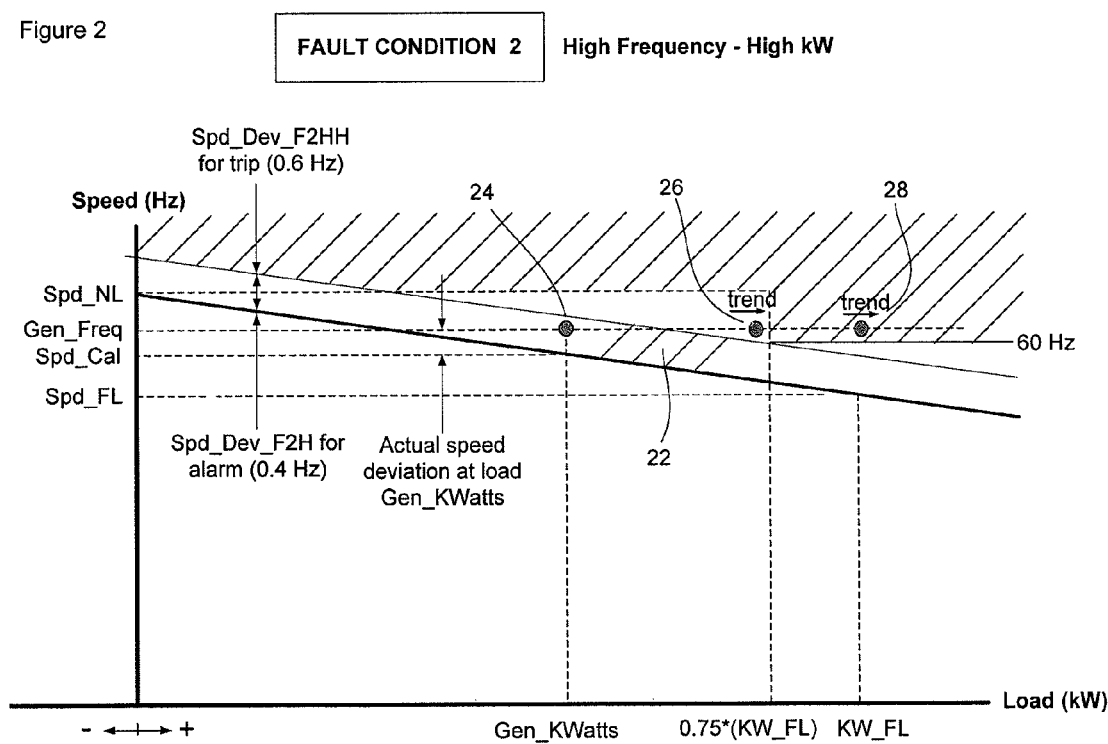
FIG. 2 is a graph of load versus speed showing the conditions for fault condition 2.

To prevent taking a generator off-line when it is still contributing kWs to the bus and not causing any stress to the bus system, the following logic is used to inhibit the trip function:
1) If the Generator load is less than 75% and
2) If the Bus Frequency is below 60.75 Hz (No-load speed 'Spd_NL') then disable the trip (alarm function is still active).
Additionally the following conditions will disable the trip:
frequency is below 60 Hz, this trip is disabled
KW <0
KW trending is neg Fault condition 2, wherein the generator is developing too much power, is illustrated in FIG. 2. An allowable over-speed deviation window 22 is illustrated. An operating point 24 is off the operating line, so the generator or controls are faulty, or the control is misadjusted. Another operating point 26 is outside the window 22 and will cause an alarm and a start-skid order if maintained for $TD\_Flt\_2A$ seconds. An operating point 28 inside this region will cause an alarm, a start-skid order and a breaker trip command if maintained for TD_Flt_2AT seconds.

| Related Process Variables & Settings - Fault Condition 2 | | | |
|---|---|---|---|
| Variable Name | Description | Source | Type |
| KW_Xdr | Generator KWs transducer | 489 | AI |
| Load_KW | Generator KW | Int | Derived Value |
| KW_FL | Full load KW. | Int | DB |
| Load_Cal | Percent of full load - (Load_KW/ KW_FL) * 100 | Int | Derived Value |
| Spd_NL | No load speed in Hz. Setting from tests. | Int | DB |
| Spd_FL | Full load speed in Hz. Setting from tests. | Int | DB |
| Freq_Xdr | Generator Frequency transducer | 489 | AI |
| Spd_Hz | Generator frequency | Int | Derived value from Freq_Xdr |
| Brk_St | Breaker status - dry contact from interposing relay | VCB | DI |
| Droop | Process variable that is determined from 2301D setup and measured using actual tests | Int | DB |
| Spd_Cal | Calculated Hz based on droop curve = Spd_NL - (Spd_NL - Spd_FL) * Droop * Load_Cal | Int | Derived Value, DB |
| Spd2_Dev (probably = Spd1_Dev) | Allowable deviation from curve, expressed in Hz and compared to calculated Hz from droop curve | Int | DB |
| KW_Rat_Max | Maximum allowable Load_KW (expressed as a percentage of Load_FL). Condition has to be maintained for at least TD_Flt_2AT seconds (with Spd_Hz more than Spd2_Dev above Spd_Cal) before the generator trip command is issued. | | |
| Fault_2A | Alarm bit for fault condition 1 - latched signal reset by operator through the HMI. | Int | DB |
| Fault_2T | Trip condition for generator, sends breaker trip to 489 via interposing relay, this signal latches and resets when the breaker is not closed. | Int | Derived Value, DO and DB |
| Fault_2L | This bit latches when Fault_2T is active and resets when the operator resets the | Int | Derived Value, DO |

Related Process Variables & Settings - Fault Condition 2

| Variable Name | Description | Source | Type |
|---|---|---|---|
|  | trips and alarms (ResetGx). This is visible on the appropriate HMI screen. |  | and DB |
| Reset_Gx | Reset for alarm and trip conditions on generator from the HMI or HW | HMI | Bit |
| TD_Flt_2AT | Time the fault condition has to be maintained before Fault_2A and Fault_2T are set. | Int | DB |

Fault Condition 3—High Frequency and Low (Negative) KW

These symptoms occur if another skid is faulted (Fault 2) and the capacity of the faulted generator is greater than the kW load on the bus. If the faulted generator develops more power than the bus load, the remaining on-line generator(s) will be motored, and their speed will therefore be at or above their no-load speed setting. Normally when this happens the generator protection system for the faulted generator should trip it off-line (as described in Fault Condition 2), and the remaining generators would then automatically be restored to normal balanced load sharing.

Any generator that detects a negative power situation and a speed at or above no-load speed will automatically generate an alarm and issue a 'Start-skid' command to the VMS—provided the condition is maintained for at least a programmed delay time. Thresholds of Spd_Dev_F3 (Hz) and KWt_Dev_F3 (kW) will apply. This alarm will be latched for 5 seconds and then automatically reset. The applicable alarm will remain active in the HMI but resetting the bit in the PLC will allow repeat occurrences to be logged.

As backup protection, if the alarm condition is maintained for more than the breaker trip time for a high frequency-high power fault (see Fault 2 above), then a tie breaker trip command will be issued via a dry contact closure in the PLC DO module. This trip is also coordinated with the Multlin reverse power trip to ensure the PLC trips the tie breaker prior to reverse power tripping of the healthy generator(s).

Figure 3:
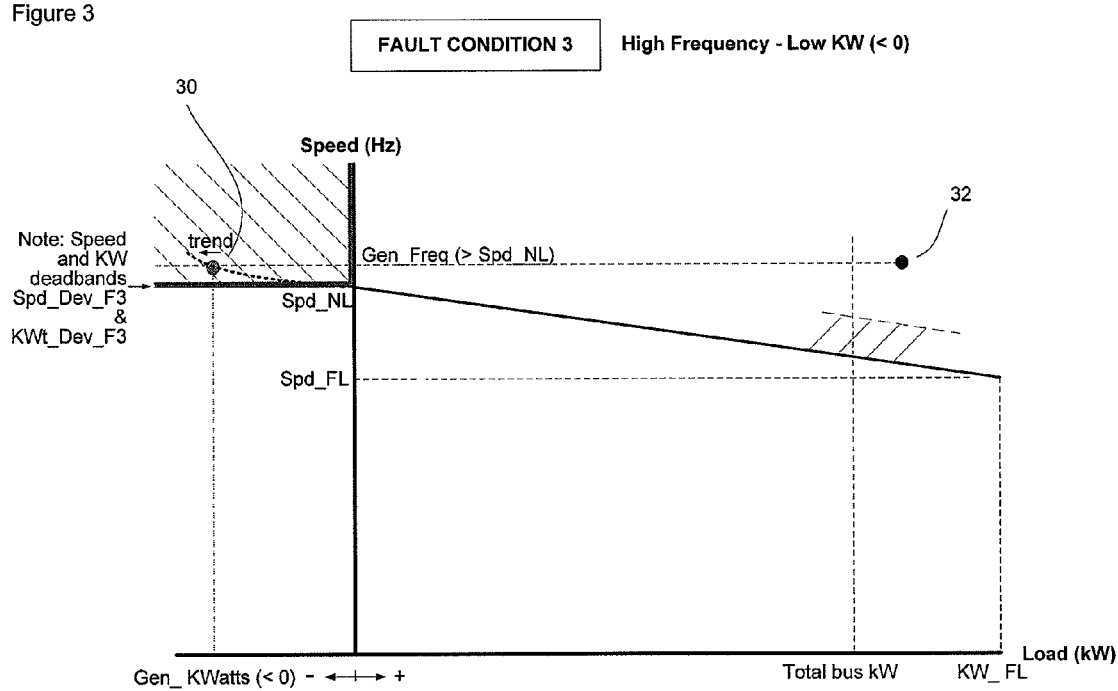
FIG. 3 is a graph of load versus speed showing the conditions for fault condition 3.

Fault condition 3 (as detected in a non-faulted generator's Generator Protection PLC), wherein a generator is OK but another generator has Fault 2, is illustrated in FIG. 3. An operating point 30 is illustrated for the non-faulted generator that is being motored. An alarm and start-skid command is issued $TD_{Flt\_2AT}$ seconds after entering this region if there is no kW recovery. A tie trip command is issued TD_Flt_ StgF34 seconds later if it is still in this region and there is still no kW recovery. Multilin reverse power trip is delayed further to allow for possible isolation of the fault through the tie trip. Another operating point 32 is for the other faulted generator. It has taken on all the system load and has enough additional power generation capacity to motor the other generators. This generator is experiencing Fault 2 and should be tripped oof by its generator protection system after TD_Flt_2AT seconds.

Related Process Variables and Settings - Fault Condition 3

| Variable Name | Description | Source | Type |
|---|---|---|---|
| KW_Xdr | Generator KWs transducer | 489 | AI |
| Load_KW | Generator KW | Int | Derived Value |
| Load_Neg | True if Load_KW < 0 (See Fault 1) | Int | Derived Value |
| Freq_Xdr | Generator Frequency transducer | 489 | AI |
| Spd_Hz | Generator frequency | Int | Derived value from Freq_Xdr |
| Brk_St | Breaker status - dry contact from interposing relay | VCB | DI |
| Spd_NL | No load speed in Hz. Setting from tests. | Int | DB |
| Fault_3A | Alarm bit for fault condition 3 - signal stays on for 5 sec and then resets. Resetting the bit in the PLC will allow repeat occurrences to be logged. Alarm remains active in the HMI until it is acknowledged. This is visible on the appropriate HMI screen. | Int | DB |
| Fault_3T | Trip bit for fault condition 3 having been maintained for longer than TD_Flt_2AT seconds (see Fault 2). Also used to send a 'skid start' signal to VMS. Dry contacts on DO module. | Int | Derived Value, DO (Qty 2) and DB |
| Fault_3L | This bit latches when Fault_3T is active and resets when the operator resets the trips and alarms (Reset_Gx). This is visible on the appropriate HMI screen. | Int | Derived Value, DO and DB |
| Spd_Dev_F3 | Amount by which speed may increase above the no-load speed | Int | DO |

Related Process Variables and Settings - Fault Condition 3 (continued)

| Variable Name | Description | Source | Type |
|---|---|---|---|
| | Spd_NL before it is considered significant - Hz | | |
| KW_Dev_F3 | Amount by which KW may go negative before it is considered significant - KW | Int | DO |
| Reset_Gx | Reset for alarm and trip conditions on G1 from the HMI or HW | HMI | Bit |
| TD_Flt_2AT | See Fault 2 table | Int | DB |

Fault Condition 4—Low Frequency (>0) and High KW

These symptoms occur if another skid is faulted and drops load (Fault 1). When this happens the remaining healthy on-line generators have to increase their power output, and their speed will therefore drop according to the droop curve. Depending on the load conditions and the number of generators on-line, it may be possible for the remaining generator(s) to become overloaded and for their speed to drop below the full-load speed. Normally the generator protection system for the faulted generator should trip this generator off-line, and the remaining generator(s) would then automatically be restored to normal balanced load sharing.

Any generator that detects an overload situation and a speed below full-load speed will automatically generate an alarm and issue a 'Start-skid' command provided these conditions are maintained for more than a preset time delay and there is no movement of the kW towards normal values during this delay. Thresholds of Spd_Dev_F4 (Hz) and KW_Dev_F4 (KW) will apply. This alarm will be latched for 5 seconds and then automatically reset. The applicable alarm will remain active in the HMI but resetting the bit in the PLC will allow repeat occurrences to be logged.

In the event the speed reduction is maintained beyond the thruster 'Frequency Spill Over' delay time, the system will trip the tie breaker to prevent total loss of power on both buses.

In the event that the current approaches trip conditions for the generator as a result of this fault, the PLC will pre-trip the tie breaker as described in this document for Fault 17.

The tie trip signal will remain latched to prevent VMS from reclosing the tie until the problem has been rectified. The trip signal will be reset when the momentary HW or HMI reset command is given.

Figure 4:
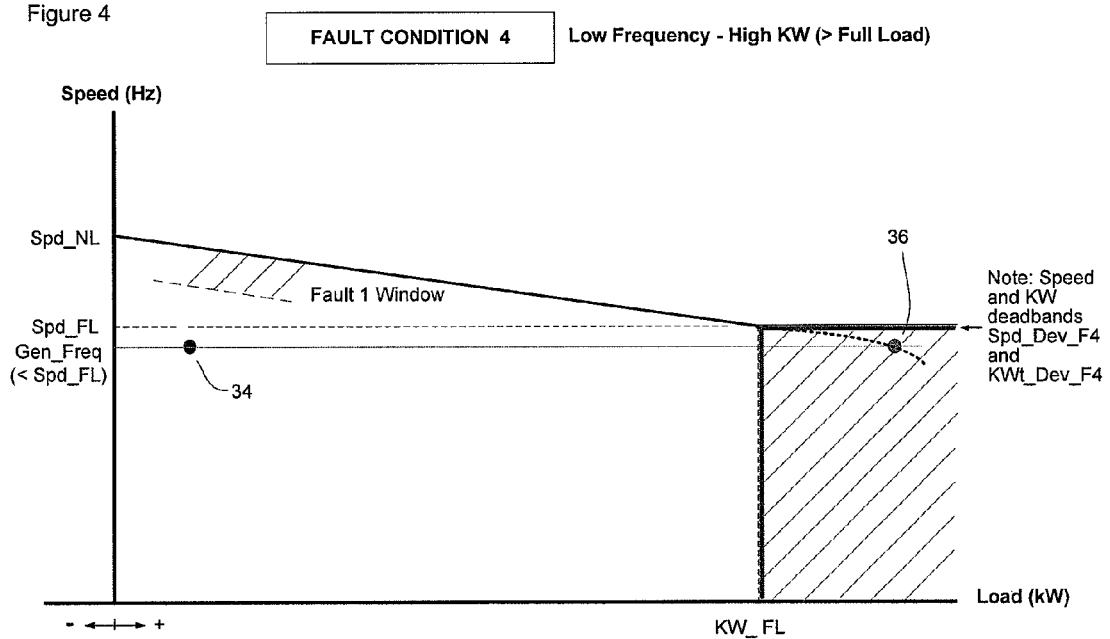
FIG. 4 is a graph of load versus speed showing the conditions for fault condition 4.

Fault Condition 4 (as detected in a non-faulted generator's Generator Protection PCT), wherein a generator is OK by another generator has Fault 1, is illustrated in FIG. 4. An operating point 34 for a faulted generator is illustrated. It has shed load and the other on-line non-faulted generators have had to take on extra load. This generator is experiencing Fault 1 and will be tripped off by its generator protection system if it enters the negative kW region and stays there for TD_Flt_1T seconds without recovery, or will be tripped on reverse power by the Multilin relay.

Related Process Variables and Settings - Fault Condition 4

| Variable Name | Description | Source | Type |
|---|---|---|---|
| KW_Xdr | Generator KWs transducer | 489 | AI |
| Load_KW | Generator KW | Int | Derived Value |
| Load_Neg | True if Load_KW < 0 (See Fault 1) | Int | Derived Value |
| Freq_Xdr | Generator Frequency transducer | 489 | AI |
| Spd_Hz | Generator frequency | Int | Derived value from Freq_Xdr? |
| Brk_St | Breaker status - dry contact from interposing relay | VCB | DI |
| Spd_FL | Full load speed in Hz. Setting from tests. | Int | DB |
| Fault_4A | Alarm bit for fault condition 4 - signal stays on for 5 sec and then resets. Resetting the bit in the PLC will allow repeat occurrences to be logged. Alarm remains active in the HMI until it is acknowledged. This is visible on the appropriate HMI screen. | Int | DB |
| Fault_4T | Trip bit for fault condition 4 having been maintained for longer than TD_Flt_1T seconds (see Fault1). Also used to send a 'skid start' signal to VMS. Dry contacts on DO module. | Int | Derived Value, DO (Qty 2) and DB |
| Fault_4L | This bit latches when Fault_4T is active and resets when the operator resets the trips and alarms (Reset_Gx). This is visible on the appropriate HMI screen. | Int | Derived Value, DO and DB |
| Spd_Dev_F4 | Amount by which speed may increase above the no-load speed Spd_NL before it is considered significant - Hz | Int | DO |
| KW_Dev_F4 | Amount by which KW may go negative before it is considered significant - KW | Int | DO |
| Reset_Gx | Reset for alarm and trip conditions on tie from the HMI or HW | HMI | Bit |
| TD_Flt_1T | See Fault 1 table | Int | DB |

Fault Condition 5—Actuator Current Abnormal

The system will measure the governor actuator current and, in the event that this current falls below 10% or 0.4 mA (effectively zero) or above 90%, the system will generate an Actuator Current Abnormal alarm and also forward a start-skid command to VMS.

Fault Condition 6—Fuel Rack Position not Tracking Actuator Current

The fuel rack position should be linearly related to the actuator current. Any gross change or irregularity in this relationship is an indication of an actuator fault (such as an open actuator coil circuit) or a problem in the linkage. This type of fault condition can deteriorate to a condition where the overall system in negatively impacted. This condition is therefore monitored and alarmed. Further deterioration if not remedied could result in a trip through Fault 1 or Fault 2.

Tracking of this condition and logging in the monitoring DB will assist in troubleshooting a follow-on trip due to Fault 1 or Fault 2.

The deviation will have to be maintained for a preset delay time before it is alarmed. This will prevent false alarms due to normal lags in the fuel rack's dynamic response.

Figure 5:
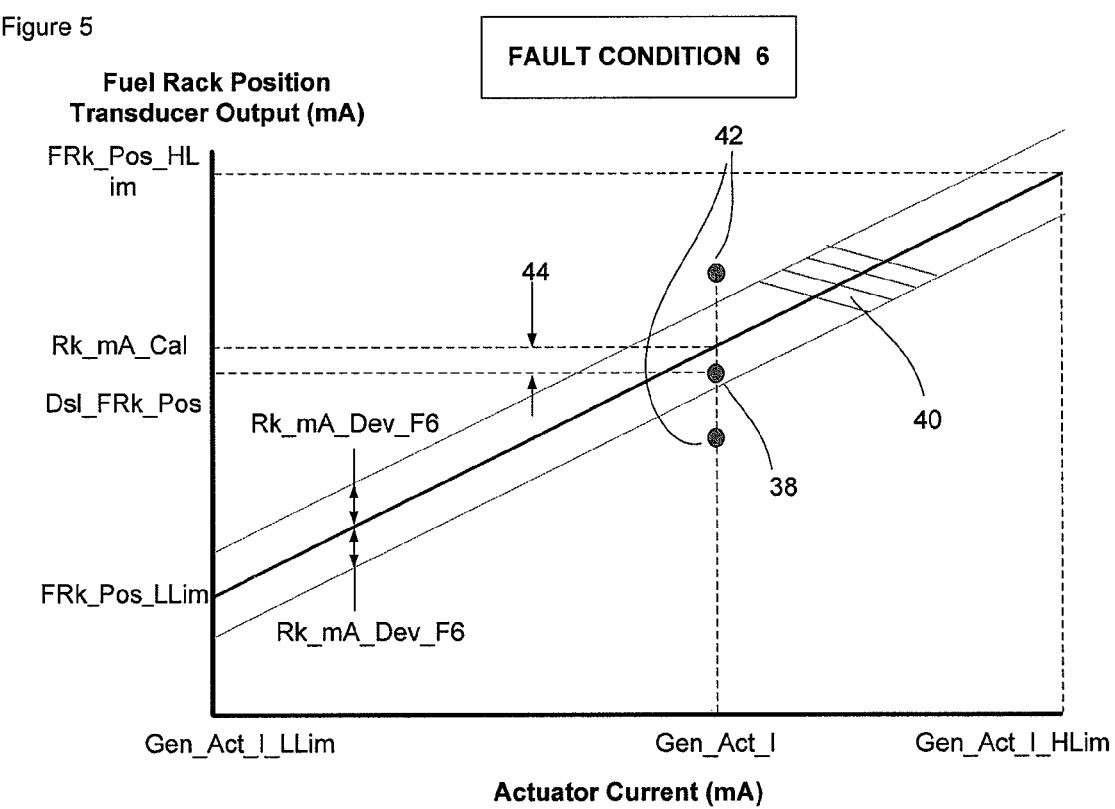
FIG. 5 is a graph of load versus speed showing the conditions for fault condition 6.

Fault Condition 6, wherein the fuel rack position is not tracking the actuator current closely enough and there is an actuator or linkage problem, is illustrated in FIG. 5. A measured rack position 38 is illustrated within an allowable deviation window 40. In addition, measured rack positions 42 are outside the allowable deviation 40 and an alarm is raised if this condition is maintained for TD_Flt_6A seconds. A range 44 represents a deviation from expected rack position transducer output.

| | Related Process Variables and Settings - Fault condition 6 | | |
|---|---|---|---|
| Variable Name | Description | Source | Type |
| Brk_St | Breaker status - dry contact from interposing relay | VCB | DI |
| Act_mA | Actuator current in milliamps | Current transducer | AI |
| Rack_mA | Rack transducer output in mA | Current transducer | AI |
| Rk_mA_Cal | Calculated rack position signal in mA from:<br>Rk_mA_Cal = m(Rack_mA) + C,<br>where:<br>$$m = \frac{(Rk\_mA\_URL) - (Rk\_mA\_LRL)}{(Act\_mA\_URL) - (Act\_mA\_LRL)} =$$<br>(Rk_mA_LRL) – m * (Act_mA_LRL) | Int | Derived value, DB |
| Rk_mA_Dev6 | Allowable deviation in rack position signal from calculated value, Rk_mA_Cal | Int | DB |
| Rk_mA_ZD | Fuel rack position transducer output values less than this will be taken as transducer faults and will inhibit the breaker alarm and trip. | Int | DB |
| Rk_mA_URL | Upper Range Limit for rack position signal - in mA (typically 20 mA) | Int | DB |
| Rk_mA_LRL | Lower Range Limit for rack position signal - in mA (typically 4 mA) | Int | DB |
| Act_mA_URL | Upper range limit value of fuel rack actuator current - in mA (typically 160 mA) | Int | DB |
| Act_mA_LRL | Lower range limit value of fuel rack actuator current - in mA (typically 160 mA) | Int | DB |
| Fault_6A | Alarm bit for fault condition 6. Alarm remains active in the HMI until it is acknowledged. This is visible on the appropriate HMI screen | Int | DB |
| Fault_6L | This bit latches when Fault_6A is active and resets when the operator resets the trip (Reset_Gx). This is visible on the appropriate the HMI screen and at the HW indicator on the 4160 V switchboard generator section. | Int | Derived Value, DO and DB |
| Fault_6_ZD | This bit latches if the rack transducer output is Rk_mA_ZD or less and resets (trip-free) when the operator reset the trip (Reset_Gx). | Int | DB |
| Reset_Gx | Reset for alarm and trip conditions on generator from the HMI or HW | HMI | Bit |
| TD_Flt_6A | Time fault condition has to be maintained before FaulT_6A is set. | Int | DB |

Fault Condition 7—Generator KW not Tracking Fuel Rack Position (Changed to Actuator Current)

The generator kW should track the fuel rack position. Any gross change or irregularity in this relationship is an indication of a fuel supply or fuel quality problem (water in the fuel, stuck injector, blocked fuel filter, no fuel supply, etc.). If this type of fault in not remedied it could result in a trip through Fault 1.

However, it is however possible for a diesel with this type of fault to continue supplying KWs for a long period of time—i.e. with half blocked fuel filter.

The appropriate response is therefore to alarm the fault if the deviation exceeds a programmed amount and is maintained for a preset delay time, TD_Flt_7A seconds—the delay preventing false alarms due to normal lags in the engine's dynamic response. The problem can then be addresses by the watchkeeping engineer—hopefully before it develops to a Fault 1 tripping condition.

On breaker close, the fault is inhibited for 25 sec to allow soft loading functions to be completed and for the generator to reach stable operation.

This function was originally designed to monitor rack position but these transducers proved to be too unreliable on installations encountered so far and therefore the function monitors the actuator command instead.

Note: This results in less direct fault discrimination—since a Fault 7 alarm could be caused by a Fault 6 conditions (i.e. Fault 6 AND Fault 7=Fault 6), whereas a Fault 7 alarm on its own is an indication of the intended fault condition (Fault 7 only=Fault 7). The diagram below WHICH FIGURE? shows the originally intended function and the installed function. In the event the highly reliable rack position sensors are fitted at anytime in the future, the function can easily be changed over to utilize this variable instead of the actuator current.

Fault Condition 7, wherein a generator kW is not tracking the fuel rack position closely enough and there is a fuel supply/quality problem, is illustrated in FIG. 6. A generator kW point 46 is within an allowable deviation window 48. In addition, generator kW points 50 are outside the allowable deviation 48 and a generator breaker is alarmed and tripped if this condition is maintained for TD_Flt_7A seconds. There is no alarm if the kW is inside a window 52, which is taken as zero fuel rack position. A range 54 represents a deviation from expected load kW.

| | Related Process Variables and Settings - Fault Condition 7 | | |
|---|---|---|---|
| Variable Name | Description | Source | Type |
| Brk_St | Breaker status - dry contact from interposing relay | VCB | DI |
| Rack_mA | Rack transducer output in mA | Current transducer | AI |
| Ld_KW_Cal | Calculated KW for rack position transducer signal Rack_mA: Ld_KW_Cal = m(Rack_mA) + C, where: $$m = \frac{(Load\ FL)}{(Rk\_mA\_URL) - (Rk\_mA\_LRL)}.$$ $$C = -m * (Rk\_mA\_LRL)$$ | Int | Derived value, DB |
| Ld_kW_Dev7 | Allowable deviation in load KW from calculated value, Ld_KW_Cal | Int | DB |
| Rk_mA_ZD | Fuel rack position transducer output values less than this will be taken as transducer faults and will inhibit the breaker alarm and trip. | Int | DB |
| Rk_mA_URL | Upper Range Limit for rack position signal - in mA (typically 20 mA) | Int | DB |
| Rk_mA_LRL | Lower Range Limit for rack position signal - in mA (typically 4 mA) | Int | DB |
| Fault_7A | Alarm bit for fault condition 7. Alarm remains active in the HMI until it is acknowledged. This is visible on the appropriate HMI screen. | Int | Derived value, DB |
| Fault_7L | This bit latches when Fault_7A is active and resets when the operator resets the trip (Reset_Gx). This is visible on the appropriate HMI screen. | Int | Derived Value, DO and DB |
| Fault_6_ZD (see fault 6) | This bit latches if the rack transducer output is Rk_mA_ZD or less and resets (trip free) when the operator resets the trip (Reset_Gx). | Int | DB |

-continued

| Related Process Variables and Settings - Fault Condition 7 | | | |
|---|---|---|---|
| Variable Name | Description | Source | Type |
| Reset_Gx | Reset for alarm and trip conditions on generator from the HMI or HW | HMI | Bit |
| TD_Flt_7A | Time fault condition has to be maintained before FaulT_7A is set. | Int | DB |

Fault Condition 8—Generator Fuel Rack/Actuator Output Hunting (Unstable)

This condition can be caused by a number of problems, including deadband in linkages, droop setting being too low, intermittent connections in the actuator and feedback circuits, faulty speed governor electronics, faulty engine/generator shaft couplings, etc. At low amplitudes it causes wear of the fuel rack linkages and annoyance to operators. At high amplitudes it can result in generator tripping and risk of blackout.

When a paralleled generator is hunting, it periodically takes on and sheds load. The unfaulted generators are forced to compensate by taking on and shedding load anti-phase. The total external load may stay constant, apart from any small effects due to the hunting induced voltage and Hz variations.

The algorithm specified here is a relatively simple one that would be used for alarm purposes only and that assumes the PLCs for the online generators will not be sharing data. The trick then is to distinguish between the effect of external load variation, which would usually be a periodic, and hunting induced load variation, which would be periodic. More sophisticated algorithms and specialized hardware such as DSP boards may be required to provide the level of discrimination required for a tie trip decision.

Example of Algorithm Application:
  Every 0.25 seconds, sample the fuel rack position. Store the last 256 elements in an 256 element array or/and data-block (DB)
  After four successive signals of increasing magnitude are encountered, flag the sampling intervals count. There will be a minimal set change level threshold to reduce noise effects, e.g. 0.5 mA.
  Look for four successive signals of decreasing amplitude and use this event to reset to an increasing magnitude search.
  Log time count when the next 4 successive signals of increasing amplitude are measured,
  Continuously compute the mean value and standard deviation of the number of sampling intervals between detected signal upswings. These upswings will be within the sampling time of 256 intervals. At least 4 upswings have to be detected in this time to provide a meaningful number of values.
  At same time use a min/max signal detection to see the signal spread over the same period.
  Alarm when the standard deviation is less than a set percentage of the mean, and the difference between the maximum and minimum signal values exceeds a settable % of the full load value.
  Display both values in the HMI and allow the HMI to adjust alarm settings.

To allow for trimming and set up, most of the pre-set values shown above as fixed values will be adjustable—either through data-block value changes or, in the case of the time deviation and the KW excursion, on the HMI screen.

This function generates an alarm on the HMI and a Generator Control System summary alarm only. There is no trip function associated with it.

| Related Process Variables and Settings - Fault Condition 8 | | | |
|---|---|---|---|
| Variable Name | Description | Source | Type |
| Brk_St | Breaker status - dry contact from interposing relay | VCB | DI |
| Load_KW(Ct_Hun_Det) | Load KW as sampled at the auto incrementing Modulo 256 count Ct_Hun_Det of the number of elapsed 0.25 second intervals since startup. Using a modulo count limits the array size to 256 elements, and auto overwrites the oldest value. Modulo arithmetic can be used to extract any value up to 256 intervals old. | Int. Var array | AI |
| Ld_KW_Max | Maximum KW value stored in the array Load_KW(Ct_Hun_Det) at any time. | Int | Derived value, DB |
| Ld_KW_Min | Minimum KW value stored in the array Load_KW(Ct_Hun_Det) at any time. | Int | Derived value, DB |
| Ld_Swg_Max | Load swing maximum. The level of load variation in KW above which an alarm may be generated if there is evidence of periodicity. This value will often be exceeded because of normal load variation. Default value 100 kW. | Int | DB |

Related Process Variables and Settings - Fault Condition 8 (continued)

| Variable Name | Description | Source | Type |
|---|---|---|---|
| Ct_KW_Sig | Minimum number of consecutive increasing KW samples, deemed as significant. Default value = 4. | Int | Derived value, DB |
| Ld_KW_Th8 | Increase or decrease in consecutive samples has to be at least this large to be considered significant. Default value 50 W. | Int | DB |
| Slope_Flag(Ct_Hun_Det) array Slope_Flag variable | Slope_Flag(Ct_Hun_Det) array value is set to +1 if the preceding Ct_KW_Sig (e.g. 4) sampled values have been increasing and Slope_Flag = −1. Slope_Flag value is also set to +1 at this time. Slope_Flag is set back to −1 after a sequence of Ct_KW_Sig, e.g. 4, increasingly negative values. This is to force the requirement for a downslope before tagging the next upslope. On startup Slope_Flag is initialized to −1. Otherwise Slope_Flag(Ct_Hun_Det) is set to zero. Thus flag array values of +1 mark distinct upslopes, and the corresponding array arguments indicate the time at which they occurred, e.g. if Slope_Flag(10) = 1 and Slope Flag (240) = 1 and the current value of Ct_Hun_Det is 10, then the interval between the detected upslopes is (10-240) MOD 256 = 26 time intervals of .25 seconds. | Int | Derived value |
| Ct_H_Mn | The mean value of the time between detected load or/and instability induced KW load increases. | Int | DB |
| Ct_H_SD | The standard deviation for the time between detected upslopes. If there are less than 4 flags set in the Slope_Flag( ) array space, the SD is set at Ct_H_Mn to avoid an alarm based on too little data. This limits detection to hunting time periods below 32 seconds. (This can be increased by increasing the sampling time or increasing the array size.) | Int | DB |
| Ct_SD-M_R % | Ratio of Ct_H_SD to Ct_H_Mn - expressed as a %. | Int. | DB. Derived value |
| Ct_SDM_RA % | Value of Ct_SD-M_R % below which it is judged there is evidence of periodic behavior. Default value 5% | Int | DB |
| Fault_8 | Alarm bit for fault condition 8. Alarm remains active in the HMI until it is acknowledged. This is visible on the appropriate HMI screen. | Int | DB |

Fault Condition 9—Generator KW>0 with Breaker Open Indication

If the generator breaker status signal indicates the generator breaker is open, and the generator KW load signal indicates a load greater than LD_KW_Dev_F9 (the preset deadband to allow for zero calibration errors) and this condition is maintained for at least TD_Flt_9 seconds (to allow for dynamic effects) then an alarm will be generated. This would indicate a loss of the breaker closed signal.

Related Process Variables and Settings - Fault Condition 9

| Variable Name | Description | Source | Type |
|---|---|---|---|
| Brk_St | Breaker status - dry contact from interposing relay | VCB | DI |
| KW_Xdr | Generator KWs transducer | 489 | AI |
| Load_KW | Generator KW | Int | Derived value |
| KW_Dev_F9 | Deadband to allow for zero voltage calibration errors. Default value 5 KW. | Int | DB |
| Fault_9A | Set if Load_KW indicates a load greater than KW_Dev_F9 and the breaker status Bkr_St indicates the breaker is open. | Int | Derived value, DB |
| Fault_9L | This bit latches when Fault_9A is active and resets when the operator | Int | Derived value, |

Related Process Variables and Settings - Fault Condition 9

| Variable Name | Description | Source | Type |
|---|---|---|---|
| | resets the trip (Reset_Gx). This is visible on the appropriate HMI screen. | | DB |
| Reset_Gx | Reset for alarm condition on generator from the HMI or HW | HMI | Bit |
| TD_Flt_9 | Time the fault condition has to be maintained before it is alarmed and Fault_9A bit set. Default 5 seconds. | Int | DB |

Fault Condition 10—Breaker Closed Indication and Hz<45

If the generator breaker status signal indicates the generator breaker is closed, and the generator Hz signal indicates a frequency less than Spd_Dev_F10 (typically set at 45 Hz) then the speed feedback signal is considered faulty and an alarm is raised.

As this speed feedback signal is used for the trip decisions for faults 1 to 4, these trips are disabled when fault 10 is detected. The alarms are left enabled.

Related Process Variables and Settings - Fault Condition 10

| Variable Name | Description | Source | Type |
|---|---|---|---|
| Brk_St | Breaker status - dry contact from interposing relay | VCB | DI |
| Freq_Xdr | Generator frequency transducer | 489 | AI" |
| Spd_Hz | Generator frequency | Int | Derived value from Freq_Xdr? |
| Hz_Dev_F10 | Deadband to allow for zero Hz calibration errors. Default value 2 Hz. | Int | DB |
| Fault_10A | Set if Sp_Hz indicates a speed less than Hz_Dev_F10 and the breaker status Bkr_St indicates the breaker is closed. | Int | Derived value, DB |
| Fault_10L | This bit latches when Fault_10A is active and resets when the operator resets the trip (Reset_Gx). This is visible on the appropriate HMI screen. | Int | Derived value, DB |
| Reset_Gx | Reset for alarm condition on generator from the HMI or HW | HMI | Bit |
| TD_Flt_10 | Time the fault condition has to be maintained before it is alarmed and Fault_10A bit set. Default 5 seconds. | Int | DB |

Generator Voltage Control Fault Monitoring

Key variables that will be utilized within the PLC algorithm to determine health of the generator with respect to speed control are:

Breaker Status
Generator Voltage
Generator KVAR

Purpose

Constantly analyze the operating conditions of the generator and apply the voltage control fault detection algorithms to detect faults in the generator and generator control system or conditions that indicate another on-line generator is faulty, and take action to prevent these faults from propagating through the plant and possibly causing a blackout. The action may be to remove the generator from the bus, send a 'Start-skid' command to the VMS, open a tie breaker so as to limit the potential power out age to just one of the main buses, or to set an alarm.

User Interface

Alarm and trip conditions are latched and need to be reset through the user interface.

Process

The generator voltage control for the system will run a droop mode. When droop and no-load voltage are set the same on all the generators, units that are electrically tied together will inherently share the reactive current and therefore KVAR equally. Consistent voltage droop will result in a predictable voltage for a given KVAR load on a generator based on a droop curve, the health of the connected diesel, and the voltage control system. A deviation from this curve beyond an acceptable window is indicative of an unhealthy status in the generator (unable to deliver the required KVAR) or a problem with the voltage control system or its control parameters.

The DECS Basler Excitation units to be used droop purely on reactive current. At 0 reactive amps there is no voltage droop on the generator where as at 100% reactive current there is full droop on the generator—regardless of the kW load on the generator.

In the event an unhealthy condition is detected and maintained beyond a certain time delay, the PLC is to respond with one or more of the following actions depending on the type of problem detected: alarm only, alarm and request VMS to Start-Next Skid, alarm and trip tie breaker, alarm and/or trip the generator breaker.

All trip functions are to be disabled when the generator breaker is open. The system is to be designed so that breaker status signal is NO. Loss of the signal will be represented as the generator being off-line and therefore all trip and generator alarm functions will be disabled. In the event of a wire break on this signal, an alarm would be generated on the system if the generator was actually still on line (KW>0).

All functions will be disabled for 20 seconds following generator breaker closure to allow the generator to take on its share of the load.

Following tripping of the generator breaker by the PLC as a result of any of the fault conditions discussed, the PLC system will prevent the VMS system from synchronizing the generator. Additionally if the Multilin Relay trips the generator breaker within 2 minutes of a previous trip, where the current has been greater than a threshold value VMS_LO_IL, then the PLC will prevent the VMS system from synchronizing the generator. In both cases, normal generator availability will be restored after the fault condition has cleared and the reset button on the generator panel has been pressed or generator lock out has been reset (as applicable).

Fault Condition 11—KVAR High, Voltage High or Field Current High

This condition indicates over-excitation, possibly due to a loss of voltage feedback to the AVR. In the case of loss of feedback for example, the AVR would see the voltage as low and attempt to increase it by increasing the field current. The resulting increase in generator field strength increases the generator armature winding emf and causes a reactive current to circulate through the paralleled generators in order to maintain their common output voltage. The generators are no longer sharing reactive load equally and the faulty generator can quickly enter an over-current (O/C) situation.

A paralleled generator that has lost feedback will have a reducing power factor as it takes on a progressively larger part of the KVAR bus load. The other unfaulted paralleled generators will have an increasing power factor as they shed kVAR load. Due to the fact that the system is running in droop, this condition can be detected by analyzing the voltage on the faulted generator. If the voltage is above its expected position on the droop curve then this generator is seen as faulty and the following actions will be taken:

Alarm and Start-Skid:

If the generator voltage operating point is above the alarm threshold curve for greater than a preprogrammed time delay then a trip alarm condition will be set and a Start-skid command sent.

Trip Generator VCB:

Trip decisions will be based on two sets of separate trip threshold curves—one for over-voltage, and the second for over-field current. One over-voltage curve will be matched with one field over-current curve to cover the situation where only a few generators are on-line and a small field over-current will cause an appreciable over-voltage. The other pair of curves will be cover the situation where a larger number of generators are on line and a larger over-current is required to produce a smaller over-voltage. If the voltage and field current operating points are both above their threshold curves for either curve pair, and are maintained in this condition for more than a programmed time delay without any kVAR recovery occurring, then an alarm, a start-skid, and a VCB trip will be initiated.

To prevent removal of a generator when it is still contributing kVARs to the bus, and is not causing additional stress on the bus, tripping will be disabled if the bus voltage is less than nominal (the normal value at mid-range of the kVAR load).

Fault condition 11, wherein the kVAR, voltage or field current is high and this is possibly due to over-excitation on the loss of voltage feedback to AVR, is illustrated in FIG. 7A. A trip 1 threshold 56, a trip 2 threshold 58, a trip alarm threshold 60 and a normal volts droop curve 62 are illustrated. As shown at 64, tripping will be disabled is kVAR is negative.

A generator voltage 66 is outside the trip alarm threshold 60, so an alarm and start-skid order will occur if the condition is maintained for TD_Fault_11A seconds. The generator VCB will also trip if the field current is in the red zone for TD_Fault_11A seconds without kVAR recovery as it is outside the Trip 1 threshold 56. The generator VCB will also trip if the field current is in the green zone for TD-Fault_11A seconds without kVAR recovery as it is outside of the trip 2 threshold 58.

The deviation from an expected voltage is shown at 68. A generator voltage 70 is outside the trip alarm threshold 60 so an alarm and start-skid order will occur if the condition is maintained for TD_Fault_1A seconds, regardless of the field current. The generator VCB will also trip is the field current is in the red zone for TD_Fault_11A seconds without kVAR recovery as it is outside the trip 1 threshold 56.

With reference to a generator voltage 72, if the field current is not in the red zone, then there will be no alarm, no trip as the voltage is below the alarm threshold 60. If the field current is in the red zone, the alarm will trip and a start-skid command will be sent and a VCB trip will occur if it is maintained for TD_Fault_11A seconds without kVAR recovery, as it is outside the Trip 1 threshold 56.

Figure 7B:
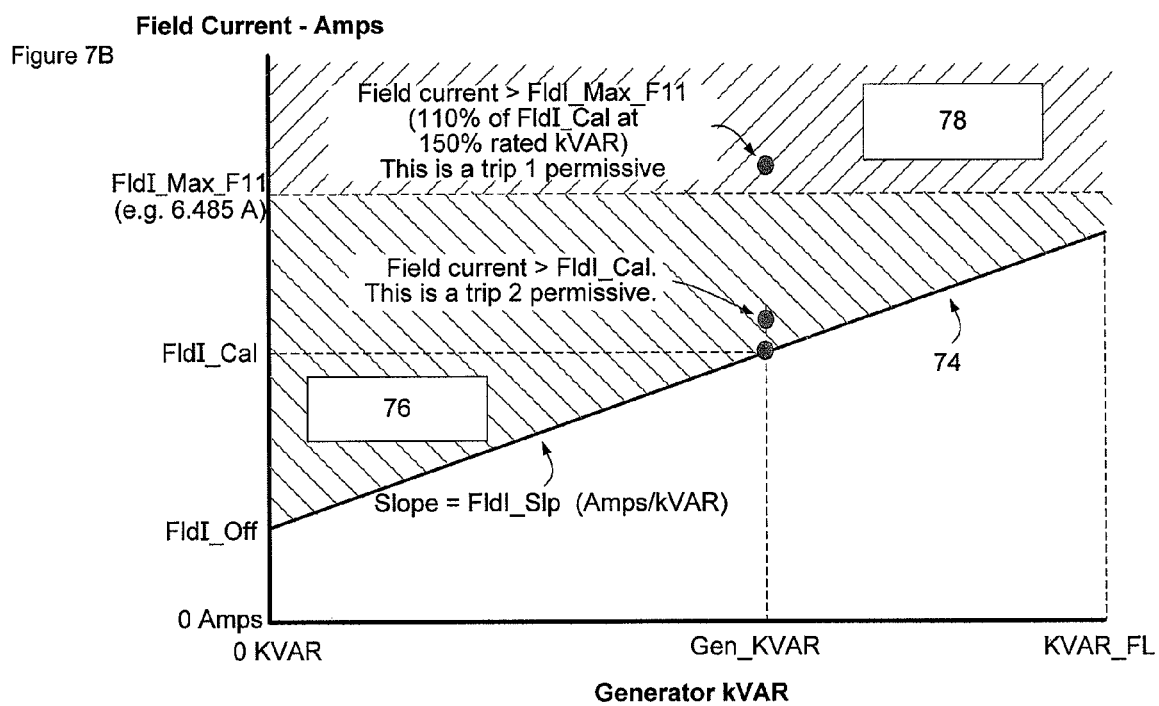
FIG. 7B is an additional view showing additional conditions with respect to fault 11.
Figure 8:
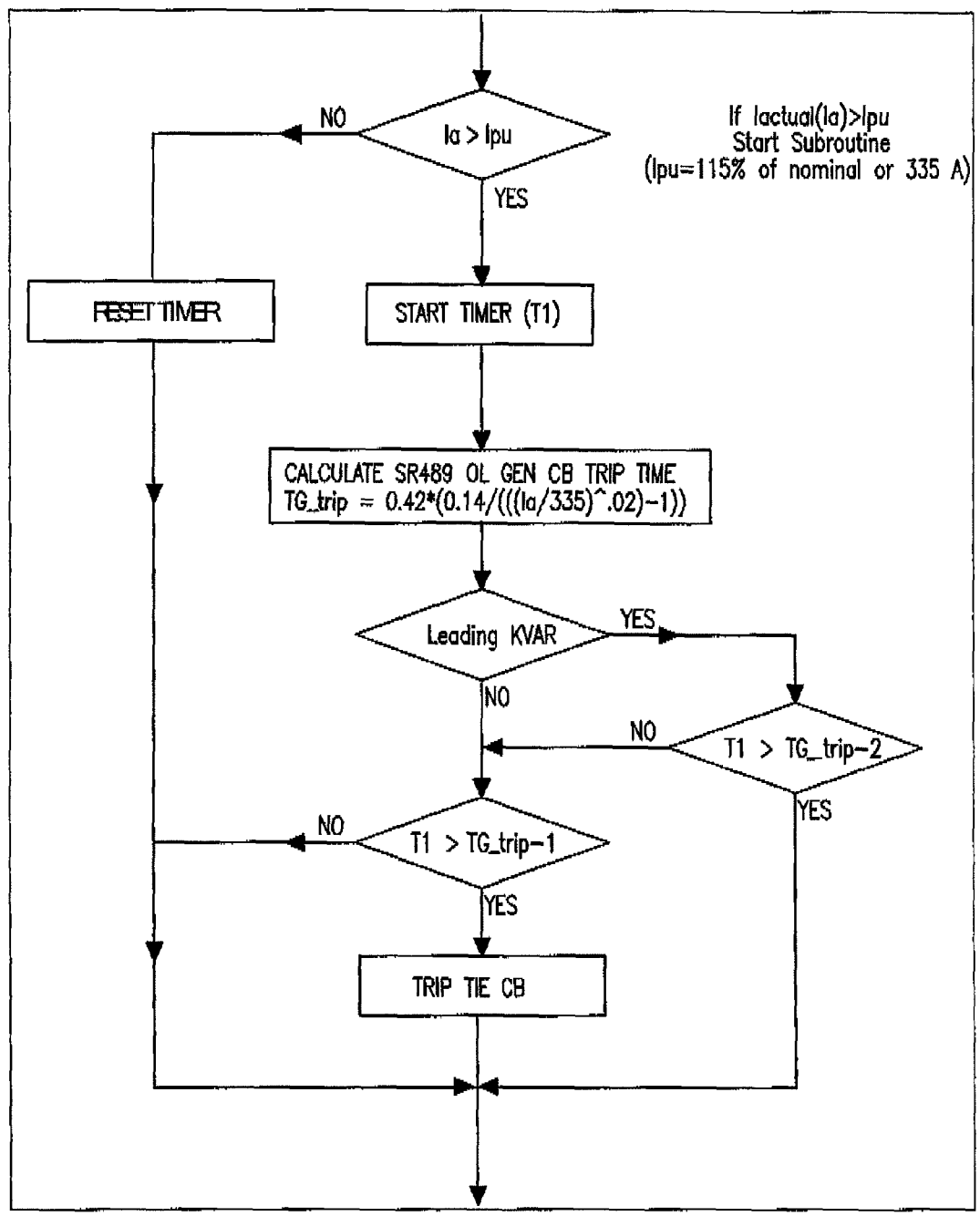
FIG. 8 is a flow chart showing the steps for sustained overcurrent tripping backup.

With additional reference to FIG. 7B, the current for unfaulted generators is on a line 74. A green zone 76 is shown above the line 74, wherein voltage is larger, the deviation is positive and a smaller number of generators are on-line. A red zone 78 is shown above the green zone 76 wherein the voltage is smaller, the deviation is positive and a larger number of generators are online.

| Related Process Variables and Settings - Fault Condition 11 | | | |
|---|---|---|---|
| Variable Name | Description | Source | Type |
| Brk_St | Breaker status - dry contact from interposing relay | VCB | DI |
| KW_Xdr | Generator KWs transducer | 489 | AI |
| KVAR_Xdr | Generator KVAR transducer | 489 | AI |
| Load_KW | Generator KW | Int | Derived value, from KW_Xdr |
| Load_KVAR | Generator KVAR | Int | Derived value, from KVAR_Xdr |
| PF | Power factor, calculated from: PF = Load_KW/[(Load_KW)^2 + (Load_KVAR)^2]^0.5. The normal value is around 0.8. | Int | Derived |
| PF_Min | Minimum allowable generator PF. Default 0.6 | Int | DB |
| TD_Flt_11A | Time in seconds PF has to be less than PF_Min before the alarm condition is reached. Default value —5 seconds. | Int | DB |

Related Process Variables and Settings - Fault Condition 11 (continued)

| Variable Name | Description | Source | Type |
|---|---|---|---|
| Fault_11A | Set if PF has been less than PF_Min with +'ve KVAR for at least TD_Flt_11A seconds. Reset automatically after 5 seconds. Resetting the bit in the PLC will allow repeat occurrences to be logged. Alarm remains active in the HMI until it is acknowledged. This is visible on the appropriate HMI screen. | Int | Derived value, DB |
| KV_Xdr | Generator KV transducer | 489 | AI |
| Load_KV | Generator KV | Int | Derived value, from KV_Xdr |
| Ld_KV_Max | Generator KV maximum. Default value TBD. | Int | DB |
| Fld_A_Xdr | Generator field current transducer. | Shunt resistor & voltage transducer. | AI |
| Fld_Amp | Generator field current in amps. | Int. | Derived value, from Fld_A_Xdr |
| Fld_A_Max | Generator field amps maximum. Default value TBD | Int | DB |
| Fault_11T | Trip bit for fault condition 11. Used to open generator breaker and issue a skid start command. This bit is set when Fault_11A is active AND (Load_KV exceeds Ld_KV_Max, OR Fld_Amp exceeds Fld_A_Max). | Int | Derived value, DO, DB |
| Fault_11L | This bit latches when Fault_11T is active and resets when the operator resets the trip (Reset_Gx). This is visible on the appropriate HMI screen. | Int | Derived value, DB |
| Reset_Gx | Reset for latched alarm condition on generator from the HMI or HW | HMI | Bit |

Fault Condition 12—KVAR Low, Voltage Low or Field Current Low

This condition indicates under-excitation due to a fault in the AVR or in the generator field circuit. The resulting decrease in generator field strength reduces the generator armature winding emf and causes a reactive current (opposite in phase to that of fault 11) to circulate through the paralleled generators in order to maintain their common output voltage.

As the faulted generator loses excitation it will reduce its contribution to the kVAR bus load and its power factor will go up. The other unfaulted paralleled generators will have a decreasing power factor as they take on more kVAR load. High power factor or –'ve kVAR combined with low voltage are therefore indications of a potential excitation problem.

Due to the fact that the system is running in droop, this condition can be detected by analyzing the voltage on the faulted generator and comparing it to its expected value as read from the droop curve:

1) If the generator voltage operating point is below the trip alarm threshold curve and the kVAR is negative (as programmed), and this condition is maintained for longer than a preprogrammed time delay, then an alarm condition will be set.
2) If the generator voltage operating point is below the calculated trip threshold curve value and stays there for longer than a preprogrammed time delay, then a trip VCB order will be issued if the kVAR is negative.
3) To assisting in detecting this fault when the number of on-line generators prevents the bus voltage falling below the preprogrammed trip level, the system also looks at field current and voltage. If the field current is less than 10% of nominal AVR output, and the voltage is slightly low (preprogrammed value currently set at 0.5% of rated no load voltage), then the system will also assume there is a fault, and will alarm and trip the VCB.

Related Process Variables and Settings - Fault Condition 12

| Variable Name | Description | Source | Type |
|---|---|---|---|
| Brk_St | Breaker status - dry contact from interposing relay | VCB | DI |
| KW_Xdr | Generator KWs transducer | 489 | AI |
| KVAR_Xdr | Generator KVAR transducer | 489 | AI |
| Load_KW | Generator KW | Int | Derived value, from KW_Xdr |
| Load_KVAR | Generator KVAR | Int | Derived value, from KVAR_Xdr |

Related Process Variables and Settings - Fault Condition 12

| Variable Name | Description | Source | Type |
|---|---|---|---|
| PF | Power factor, calculated from: PF = Load_KW/[(Load_KW)$^2$ + (Load_KVAR)$^2$]$^{0.5}$. The normal value is around 0.8. | Int | Derived |
| PF_Max | Maximum allowable generator PF. Default 1 | Int | DB |
| TD_Flt_12A | Time in seconds PF has to be more than PF_Max OR the KVAR has been −'ve before the alarm condition is reached. Default value: 5 seconds. | Int | DB |
| Fault_12A | Set if PF has been more than PF_Max OR the KVAR has been negative for at least TD_Flt_12A seconds. Reset automatically after 5 seconds. Resetting the bit in the PLC will allow repeat occurrences to be logged. Alarm remains active in the HMI until it is acknowledged. This is visible on the appropriate HMI screen. | Int | Derived value, DB |
| KV_Xdr | Generator KV transducer | 489 | AI |
| Load_KV | Generator KV | Int | Derived value, from KV_Xdr |
| Ld_KV_Min | Generator KV minimum. Default value TBD. | Int | DB |
| Fld_A_Xdr | Generator field current transducer. | Shunt resistor & voltage transducer. | AI |
| Fld_Amp | Generator field current in amps. | Int. | Derived value, from Fld_A_Xdr |
| Fld_A_Min | Generator field amps minimum. Default value TBD | Int | DB |
| Fault_12T | Trip bit for fault condition 12. Used to open generator breaker and issue a skid start command. This bit is set when Fault_12A is active AND (Load_KV is less than Ld_KV_Min, OR Fld_Amp is less than Fld_A_Min). | Int | Derived value, DO, DB |
| Fault_12L | This bit latches when Fault_12T is active and resets when the operator resets the trip (Reset_Gx). This is visible on the appropriate HMI screen. | Int | Derived value, DB |
| Reset_Gx | Reset for latched alarm condition on generator from the HMI or HW | HMI | Bit |

Fault Condition 13—Power Factor Low Leading, KVAR Low (Negative)

This is an indication that another generator maybe suffering from an over-excitation fault condition 11 but has not tripped out in the expected time, TD_Flt_11A seconds. It will raise an alarm based on power factor remaining low and leading or voltage remaining and approaching the over voltage setpoint defined in the protection relay.

In the event that the system reaches the negative KVAR minimum trip level set in the Multilin plus a percentage offset, the system will trip the Tie before the preset trip time in the Multilin to isolate the problem.

In the event that the current approaches trip conditions for the generator, the PLC will pre-trip the Tie and as described in this document under Fault 17.

In the event that the voltage is above the voltage threshold defined in the protection relay the PLC will pretrip the Tie to isolate the fault. As this is more of a bus related issue, this function may be carried out in an alternate device if available—i.e. a feeder protection relay.

Related Process Variables and Settings - Fault Condition 13

| Variable Name | Description | Source | Type |
|---|---|---|---|
| Brk_St | Breaker status - dry contact from interposing relay | VCB | DI |
| KW_Xdr | Generator KWs transducer | 489 | AI |
| KVAR_Xdr | Generator KVAR transducer | 489 | AI |
| Load_KW | Generator KW | Int | Derived value, from KW_Xdr |

Related Process Variables and Settings - Fault Condition 13

| Variable Name | Description | Source | Type |
|---|---|---|---|
| Load_KVAR | Generator KVAR | Int | Derived value, from KVAR_Xdr |
| PF | Power factor, calculated from: PF = Load_KW/[(Load_KW)^2 + (Load_KVAR)^2]^0.5. The normal value is around 0.8. | Int | Derived |
| PF_Max (same as for Fault Condition 12) | Maximum allowable generator PF. Default 1.0 | Int | DB |
| TD_Flt_11A (same as for Fault Condition 11) | Time in seconds PF has to be more than PF_Max OR the KVAR has been −'ve (leading) before the alarm condition is reached. Default value: 5 seconds. | Int | DB |
| Fault_13A | Set if PF has been more than PF_Max OR the KVAR has been −'ve (leading) for at least TD_Flt_11A seconds. Reset automatically after 5 seconds. Resetting the bit in the PLC will allow repeat occurrences to be logged. Alarm remains active in the HMI until it is acknowledged. This is visible on the appropriate HMI screen. | Int | Derived value, DB |
| KV_Xdr | Generator KV transducer | 489 | AI |
| Load_KV | Generator KV | Int | Derived va006Cue, from KV_Xdr |
| Ld_KV_Max (same as for Fault Condition 11) | Generator KV maximum. Default value TBD. | Int | DB |
| Fault_13T | Trip bit for fault condition 13. Used to open tie breaker. This bit is set when Fault_13A is active AND Load_KV exceeds Ld_KV_Max . . . | Int | Derived value, DO, DB |
| Fault_13L | This bit latches when Fault_13T is active and resets when the operator resets the trip (Reset_Gx). This is visible on the appropriate the HMI screen. | Int | Derived value, DB |
| Reset_Gx | Reset for latched alarm condition on generator from the HMI or HW | HMI | Bit |

Fault Condition 14—Power Factor Low Lagging, KVAR High (Positive)

This is an indication that another generator is suffering under-excitation fault condition 12 but has not tripped out in the expected time, TD_Flt_12A seconds. It will raise an alarm based on the power factor remaining low and lagging and KVAR being high (positive).

In the event that the system reaches the positive KVAR minimum trip level set in the Multilin less a percentage offset, the system will trip the Tie before the preset trip time in the Multilin to isolate the problem.

In the event that the current approaches trip conditions for the generator, the PLC will pre-trip the Tie as described in this document under Fault 17.

Related Process Variables and Settings - Fault Condition 14

| Variable Name | Description | Source | Type |
|---|---|---|---|
| Brk_St | Breaker status - dry contact from interposing relay | VCB | DI |
| KW_Xdr | Generator KWs transducer | 489 | AI |
| KVAR_Xdr | Generator KVAR transducer | 489 | AI |
| Load_KW | Generator KW | Int | Derived value, from KW_Xdr |
| Load_KVAR | Generator KVAR | Int | Derived value, from KVAR_Xdr |

-continued

Related Process Variables and Settings - Fault Condition 14

| Variable Name | Description | Source | Type |
|---|---|---|---|
| PF | Power factor, calculated from: PF = Load_KW/[(Load_KW)^2 + (Load_KVAR)^2]^0.5. The normal value is around 0.8. | Int | Derived |
| PF_Min (same as for Fault Condition 11) | Minimum allowable generator PF. Default 0.6 | Int | DB |
| TD_Flt_12A (same as for Fault Condition 12) | Time in seconds PF has to be less than PF_Min AND KVAR +'ve (lagging) before the alarm condition is reached. Default value - 5 seconds. | Int | DB |
| Fault_14A | Set if PF has been less than PF_Man AND KVAR +'ve for at least TD_Flt_12A seconds. Reset automatically after 5 seconds. Resetting the bit in the PLC will allow repeat occurrences to be logged. Alarm remains active in the HMI until it is acknowledged. This is visible on the appropriate HMI screen. | Int | Derived value, DB |
| KV_Xdr | Generator KV transducer | 489 | AI |
| Load_KV | Generator KV | Int | Derived value, from KV_Xdr |
| Ld_KV_Min | Generator KV minimum. Default value TBD. | Int | DB |
| Fault_14T | Trip bit for fault condition 14. Used to open tie breaker. This bit is set when Fault_14A is active AND Load_KV is less than Ld_KV_Min. | Int | Derived value, DO, DB |
| Fault_14L | This bit latches when Fault_14T is active and resets when the operator resets the trip (Reset_Gx). This is visible on the appropriate HMI screen. | Int | Derived value, DB |
| Reset_Gx | Reset for latched alarm condition on generator from the HMI or HW | HMI | Bit |

Fault Condition 15—Unstable Voltage Control—Hunting

This condition can be caused by the voltage droop setting being too low, AVR gain too high, by faulty AVR electronics or by an unstable load. At low amplitudes it causes annoyance to operators. At high amplitudes it can result in generator tripping and risk of blackout.

When a paralleled generator is hunting, it periodically takes on and sheds reactive load. The unfaulted generators are forced to compensate by taking on and shedding reactive load anti-phase—the external reactive load staying constant, apart from any changes due to voltage fluctuations.

The algorithm that will be specified here is a relatively simple one that would be used for alarm purposes only and that assumes the PLCs for the online generators will not be sharing data. The trick then is to distinguish between the effect of external reactive load variation, which would usually be a periodic, and hunting induced reactive load variation, which would be periodic. More sophisticated algorithms and specialized hardware such as DSP boards may be required to provide the level of discrimination required for tie trip decisions.

Fault Condition 15B, which follows, assumes that facilities are provided for sharing data between the generator PLCs, or that total KVAR load is available from another source, such as VMS. The algorithm is then much simpler.

This function generates an alarm on the HMI and a Generator Control System summary alarm only. There is no trip function associated with it.

Example of Simple Algorithm Application

Every 0.25 seconds, sample the generator KVAR. Store the last 256 elements in an 256 element array or/and DB After four successive signals of increasing magnitude are encountered flag the sampling intervals count. There will be a minimal set change level threshold to reduce noise effects, e.g. 50 watts.

Look for four successive signals of decreasing amplitude and use this event to reset to an increasing magnitude search.

Log time count when next 4 successive signals of increasing amplitude are measured.

Continuously compute the mean value and standard deviation of the number of sampling intervals between detected KVAR upswings. These upswings will be within the sampling time of 256 intervals. At least 4 upswings have to be detected in this time to provide a meaningful number of values.

At same time use a min/max kVAR detection to see the KVAR spread over the same period.

Alarm when the standard deviation is less than a set percentage of the mean, and the difference between the maximum and minimum KVAR values exceeds a settable % of the full load value.

Display both values in the HMI and allow the HMI to adjust alarm settings.

To allow for trimming and set up, most of the pre-set values shown above as fixed values will be adjustable—either through DB value changes or, in the case of the time deviation and the KW excursion, on the HMI screen.

| | Related Process Variables and Settings - Fault Condition 15 | | |
|---|---|---|---|
| Variable Name | Description | Source | Type |
| Brk_St | Breaker status - dry contact from interposing relay | VCB | DI |
| Load_KVAR (Ct_Hun_Det) | Load KW as sampled at the auto incrementing Modulo 256 count Ct_Hun_Det of the number of elapsed 0.25 second intervals since startup. Using a modulo count limits the array size to 256 elements, and auto overwrites the oldest value. Modulo arithmetic can be used to extract any value up to 256 intervals old. | Int. Var array | AI |
| L_KVAR_Max | Maximum load KVAR value stored in the array Load_KVAR(Ct_Hun_Det) at any time. | Int | Derived value, DB |
| L_KVAR_Min | Minimum load KVAR value stored in the array Load_KVAR(Ct_Hun_Det) at any time. | Int | Derived value, DB |
| LR_Swg_Max | Load reactive swing maximum. The level of load variation in KVAR above which an alarm may be generated if there is evidence of periodicity. This value will often be exceeded because of normal load variation. Default value 100 kVAR. | Int | DB |
| C_KVAR_Sig | Minimum number of consecutive increasing KVAR signal samples, deemed as significant. Default value = 4. | Int | Derived value, DB |
| L_KVAR_Th8 | Increase or decrease in consecutive samples has to be at least this large to be considered significant. Default value 50 VAR. | Int | DB |
| Sl_Flg_R(Ct_Hun_Det) array Sl_Flg_R variable | Slope flag reactive. Sl_Flg_R(Ct_Hun_Det) array value is set to +1 if the preceding C_KVAR_Sig (e.g. 4) sampled values have been increasing and Sl_Flg_R = −1. Sl_Flg_R is also set to +1 at this time. Sl_Flg_R is set back to −1 after a sequence of Ct_KVAR_Sig, e.g. 4, increasingly negative values. This is to force the requirement for a downslope before tagging the next upslope. On startup Sl_Flg_R is initialized to −1. Otherwise Sl_Flg_R(Ct_Hun_Det) is set to zero. Thus flag array values of +1 mark distinct upslopes, and the corresponding array arguments indicate the time at which they occurred, e.g. if Sl_Flg_R(10) = 1 and Sl_Flg_R(240) = 1 and the current value of Ct_Hun_Det is 10, then the interval between the detected upslopes is (10-240) MOD 256 = 26 time intervals of .25 seconds. | Int | Derived value |
| C_H_R_Mean | Count hunting reactive mean. The mean value of the time between detected load or/and instability (hunting) induced KVAR load increases. | Int | DB |
| C_H_R_SD | Count hunting reactive standard deviation. The standard deviation for the time between detected (hunting) upslopes. If there are less than 4 flags set in the Sl_Flg_R( ) array space, the SD is set at C_H_R_Mean to avoid an alarm based on too little data. This limits detection to hunting time periods below 32 seconds. (This can be increased by increasing the sampling time or increasing the array size.) | Int | DB |
| SD-Mean_R % | Standard deviation to mean —count ratio in %: C_H_R_SD * 100/C_H_R_Mean | Int. | DB. Derived value |
| SD-Mn_RA % | Value (Allowable) of SD-Mean_R % below which it is judged there is evidence of periodic behavior. Default value 5% | Int | DB |

Related Process Variables and Settings - Fault Condition 15

| Variable Name | Description | Source | Type |
|---|---|---|---|
| Fault_15 | Alarm bit for fault condition 15. Alarm remains active in the HMI until it is acknowledged. This is visible on the appropriate HMI screen. | Int | DB |

Fault Condition 16—Loss of Exciter Current

This would occur if the field circuit is opened, if there a loss of AVR output due to an AVR fault or if there was a sensing circuit problem. In the event that this occurs the system will generate an alarm notifying the operator that there is a problem. This alarm is only active when the VCB is closed. In the event that the generator has actually lost excitation, this fault would be followed immediately by a fault 12 condition and the generator would be tripped off line.

A threshold current value of Fld_Amp_Th will apply. Actuator currents within this window will be judged as zero. This alarm will be latched for 5 seconds and then automatically reset. The alarm will remain active in the HMI but resetting the bit in the PLC will allow repeat occurrences to be logged.

As this is a critical signal for Faults 12, and will disable the exciter current related portion of the logic when in alarm condition.

Related Process Variables and Settings - Fault Condition 16

| Variable Name | Description | Source | Type |
|---|---|---|---|
| Brk_St | Breaker status - dry contact from interposing relay | VCB | DI |
| Fld_A_Xdr | Generator field current transducer. | Shunt resistor & voltage transducer. | AI |
| Fld_Amp | Generator field current in amps | Current transducer | AI |
| Fld_Amp_Th | Threshold absolute value (in A) below which the actuator current will be judged to be zero. | Int | DB |
| Fault_16A | Alarm bit for fault condition 16. Alarm remains active in the HMI until it is acknowledged. This is visible on the appropriate HMI screen. | Int | DB |
| Fault_16L | This bit latches when Fault_16A is active and resets when the operator resets the trip (Reset_Gx). This is visible on the appropriate HMI screen. | Int | Derived Value, DO and DB |
| Reset_Gx | Reset for alarm and trip conditions on generator from the HMI or HW | HMI | Bit |

Fault Condition 17—Sustained Current Overload Trip

The Multin SR489 Relay is the primary method for protecting the generator from the effect of sustained current overload from any cause—whether induced by a failure of the generator's control systems, or due to a failure or overload on the connected bus.

The generator protection system PLC will provide backup secondary protection and improved fault isolation by prior tripping of the tie breaker if the KVAR is lagging (+), or if the KVAR is leading (−). Here the word 'prior' is used to indicate tripping a fixed number of seconds before the SR489 would otherwise trip the generator breaker because of the sustained current overload. If the overcurrent condition continues after the tie breaker has tripped, the generator breaker will be tripped by the 489 Relay.

The PLC initiated tie breaker trips will be alarmed on the HMI and will cause the red fault indicator light (device-H FLT) on the generator panel door to come on. Both the alarms and the trips will be latched. Reset will be via the HMI or HW (device-S RST) reset buttons.

The method used to achieve this backup protective action is as follows (see FIG. 8):

If the actual generator current (Ia)* exceeds the overload protection pickup point (Ipu—set at 434A), the PLC is to start timing. The PLC is then to calculate the time it will take the Multilin SR489 relay to trip the generator breaker on overload.

The overload protection curve currently programmed in the Multilin SR489 relays for this installation is:

ANSI Extremely Inverse Curve with a multiplier setpoint (M) of 0.42. Notice that the K, E constants for this curve are 0.140 and 0.020 respectively.

After the calculation, the PLC is to trip the tie breaker 2 seconds before the calculated time it will take the SR489 to trip the generator (note this timing is approximate). If the overload condition disappears before the timer has timed out, the operation is to be cancelled and the timer is to be reset.

The actual generator current is calculated as follows:

$$Ia = \text{Load\_Amps} = [(\text{Load\_KW}^2 + \text{Load\_KVAR}^2)^{0.5}]/[1.73 * \text{Load\_KV}]$$

Additional Miscellaneous Functions Fault Condition 18—SPM-D, 2301D and DESC Fault Monitoring Due to a lack of available points on the Multilin SR489 Relay, the PLC will be used to provide monitor the status of these three devices through paralleled auxiliary contacts (OR'd) providing an input to the PLC. The PLC will monitor this input, if this input goes high the system will initiate and alarm at the HMI and locally at the generator cabinet. The condition is also used in the Tie Trip logic and will result in the Tie Breaker being tripped.

Fault Condition 19—System Health

Through the system self monitoring described in more detail later in this document, in the event of a system health fault, the PLC disables all of the its alarm and trip functions with the exception of a system health alarm in the HMI and the local digital alarm output if it is available.

It is important to note that local alarm circuit is failsafe and that in the event of any failure in the PLC or associated alarm output wiring, local alarm indication will be active through a separate 110 VDC supply and the VMS will receive an alarm through loss of signal to the 489/Gen Prot system alarm.

Fault Condition 20—Failure to Operate

Additional self monitoring is included in the system that monitors the expected feedback when ever the system takes action. i.e. when the system issues a VCB Trip command it will monitor the system for feedback that the breaker status is open within a preset time delay. In the event that there is no feedback, the system will issue an alarm.

Fault Condition 21—VMS Lockout Function

The Multlin 489 design does not accommodate the logic functions necessary to determine if reclose of a generator breaker after a long time over current trip is the appropriate action to take or if VMS should be prevented from being able to attempt a reclose. The Generator protection PLC is to be used to supervise this function by R1 hold function. This function holds the VCB trip signal to the Multilin high (and therefore R1 output on the Multilin high) long enough trip the K_TR and lockout the generator through the 86 relay.

Whether a generator recloses should be based on whether the overload was load related or bus related. If the fault is load related then when the generator trips the breaker it is likely the that load will be cleared from the bus after power has been lost. In the event that the over load is on the bus then the generator will trip on overload each time it is closed—this is undesirable but so is a situation where a generator is healthy, the bus is healthy yet the generator is not accessible to the VMS.

The system has been programmed to circumvent these two issues through the incorporation of the following logic:

Load Related Fault:

If a generator trips on over current the PLC will take no action if there have been no other trips in the last 2 minutes. This is based on a preset time delay programmed in the PLC. Therefore if the trip is load related and the faulted load clears after loss of power, then the VMS will reclose the breaker and the generator should stay on line.

Bus Related Fault:

If the fault is bus related then the VMS will reclose and then trip again on over current. If the PLC see a VCB status of: open-closed-open within a two minute window and if at any time during the period that the breaker was closed and the generator current was over 90% rated current, then the PLC will prevent the VMS from carrying out future closes through VMS lock out function and the 86 relay.

Generator Protection Trip Faults

In the event of a Fault 1, 2, 11 or 12. The system will allow the generator 2 attempts to reclose if it is available. After the second failed attempt the Generator Protection PLC will lockout the generator and provide an VMS lock signal.

Fault Condition 22—Fault Override Tie Sync Bias Active

The system provides synchronization across the tie breaker by biasing the speed on Bus A generators (G1-3). As a result there are normal operational configurations where the generators on Bus A can have a speed bias applied to them when on load to facilitate synchronization across the Bus Tie. This speed bias will push a deviation from the droop curve for the Bus A Generators, each stand alone Generator protection PLC must disable Fault 1-4 governor trips and alarms during the period this bias is active.

This feature has also been added to B Bus Generators. Although there is no physical way of having a speed bias injected from the Tie SPM-D, this will still provide additional protection in the event that there is a K_52A relay fault that allows the generators SPMD to bias the governor speed when it is on line.

To accomplish this the system monitors the sync bias voltage on T19/T20 and if the breaker is closed and there is voltage on these terminals (Tie SPMD is attempting a sync or there is a system fault that result in voltage being applied to these terminals), then the system inhibits the governor faults 1-4 until the condition has cleared.

Generator Protection System Self-Monitoring & Special Functions

Programmed Self Monitoring

The PLC program uses available module and communication diagnostics to prevent the system issuing false alarm and trip signals in the event of a PLC fault, and to provide fault discrimination via PLC LED indications or/and the HMI alarms:

I/O module faults detected by the CPU will cause all generator protection system trips and alarms for that generator to be inhibited, and a PLC I/O Module Fault for that generator's protection system to show on the HMI. When the faults are cleared the alarms and trips will automatically be reset and then re-enabled. The fault will have to be acknowledged on the screen before the I/O module fault indication will be removed.

Diagnostic messages from faulted AI Modules will be used to discriminate the fault in the HMI:

External auxiliary supply lost
Configuration error
Wire break
Signal over-range/under-range Diagnostic messages from faulted DI/DO modules will be used to discriminate the fault in the HMI (or alternative acceptable means):

Internal/External auxiliary voltage missing
Configuration error
Fuse in module defective
Defective module A Generator Protection PLC FMECA will be required to detail all possible PLC system failure modes and the design action taken to minimize their effects. The effectiveness of these measures is to be demonstrated in the FAT.

Loss of PLC Power

Latched trip signals will go to their released status on loss of PLC power.

GE Multilin 489 Relay Data Capture

Any time the generator protection system generates an alarm it will capture the Multilin database. Up to 10 sets of data will be captured to facilitate trouble-shooting of cascading faults. Each set of data will be time-stamped with the Multilin Relay time stamp and the PLC time stamp, and will include the alarm ID e.g. 'Fault 16' as per the 489 Relay documentation.

Base Load Diesel Function

As a maintenance item, the VMS has been set up with a method of allowing the operator to load up a generator so that it has a disproportional amount of the plant load. Without monitoring of this function the generator protection system would trip a skid that was in this mode based on a Spd Control related fault.

The system has been designed to integrate the base load function from both a generator control and protection point of view.

Base load is selected by the operator through the Base Load select switch at each generator cubicle, the PLC provides the signals and logic necessary to switch the control of the 2301D to a Load Control Mode, to provide the 2301D with the load reference required to carry out the Base Load function and to provide continued speed control failure protection to the power generation system while in the Base Load mode.

When Base Load is selected the control system carries out the following actions:
1) activates relay K_LCNTL—this sets the Droop/Isochronous input high in on the 2301D and sets the controller to load control mode (ref: analog input 2, T22&23). Load control indication at the SWBD and on the HMI will be ON.
2) The analog output (AO01) from the PLC, constantly mirrors the current load in the form of a 0-5 VDC signal that represents 0-100% load—when the function becomes active the this output then switches from 'Load Follow-up' mode to 'Ramp to Base Load Target' mode. The 'Target Base Load' is defined by the 0-5 VDC PLC input provided through the voltage divider and pot (–R2), this signal represents a 0-100% load reference.
3) The engine is then in closed loop KW control at the 2301D.
4) When the 'Base Load' select switch is switched back to 'Droop', the system ramps from the 'Target Base Load' to a KW value calculated from the bus frequency and droop curve. This is a dynamic target—i.e. it will change based on the percent loading of the other on-line generators.
5) When the calculated KW reference equals the calculated KW for bus frequency, the system will revert to Droop Mode by de-energizing K_LCNTL. The system will then be back in 'Droop' mode, 'Load Cntl Active' indication on the SWBD and the HMI will be OFF.
6) In the event any of the following occurs, the system will revert to 'Droop' mode immediately.
   a) the system monitors a load deviation exceeding a preset value for longer than a preset time delay.
   b) there is a deviation between the load reference and load reference feedback that exceeds a preset value for a preset time.
   c) the system bus frequency is higher or lower than the nominal frequency range of 59.25-60.75 Hz for longer than a preset time delay
   d) base load function times out based on an operator preset function timer (available to set from the HMI with a range of 0-60 minutes)
   e) Any time the Base Load is de-activated and the Droop/Base Load switch is in the 'Base Load' position, the Alarm indication on the SWBD will flash and the HMI will display 'Base Load Control Error'.
   f) Any time the system is automatically removed from Base Load or set to Base Load when it is disabled, a 'Gen Cntl Common' alarm is generated by the PLC and sent to the VMS—this condition clears when the Droop/Base Load switch is switch back to 'Droop' and the Alarm Reset on the generator front panel is pressed.
   g) If the system is in Base Load with the VCB open, after a 30 second time delay a Generator Cntl Common alarm is sent to the VMS, the Gen Set Ready input to the VMS is set low by the PLC and the generator protection HMI alarms and logs and 'Base Load with VCB Open' alarm.

This mode will typically be activated on a periodic basis for approximately 20 minute intervals. When this function is active, the system will disable any spd controller related faults or alarms (Fault 1-4) but the system will remain protected due to the functions defined above (system reverts to droop if there are any problems detected with associated generator or bus).

During 'Droop' operation, if the system sees a deviation greater than a preset value between the 'Load Follow-up' reference on Input 2 of the 2301D and the 'Load Reference Feedback' signal measured by the PLC, the system will activate a 'Gen Cntl Common' alarm and will disable and load control functions (K_LCNTL will not energize).

Load/Unload Diesel Function

Due to load control limitations/complications with carrying out load control function on the Woodward governor when operating in Droop mode, the system utilizes the PLC to facilitate the soft load and unload functions through the external load control input on the 2301D.

Essentially whenever the system is executing a sync and load command from the Switchboard or the VMS or an unload command from the VMS the function is active. Unloading from the Switchboard is done using the load control pot with the generator control switched to Base Load mode.

The system carries out the following actions to execute a soft load function:
1) If the bus is live and the VCB is open, then the PLC sets the Generator to load control mode by energizing K_LCNTL
2) The SPMD is provided a Run command by the operator or VMS and the Generator VCB closes.
3) The 'Follow-up' load reference is at 5%.
4) On breaker close, the generator controls load at the load reference (5%).
5) On breaker close the PLC sets a ramp to a dynamic target load based on Bus Frequency (note this target will change as the other generators on the bus shed load). The PLC ramps the load reference output to at a preset rate to achieve the target load.
6) When the target load is reached, the PLC de-energizes K_LCNTL and sets generator operation to droop mode.
7) If any of the following conditions occur during the soft load process, the PLC will de-energize K_LCNTL and drop the generator out of load control mode.
   a) the system monitors a load deviation (comparison between load reference output and calculated KW) exceeding a preset value for longer than a preset time delay.
   b) there is a deviation between the load reference and load reference feedback that exceeds a preset value for a preset time.
   c) the system bus frequency is higher or lower than the nominal frequency range of 59.25-60.75 Hz for longer than a preset time delay.

The system carries out the following actions to execute a soft unload function:
1) The system sees a maintained high signal for the 'Unload and Open' input.
2) Prior to the PLC enter a load control mode, the PLC will be in 'Load Follow-up' mode providing a 'Load Reference' that equals the generator load, thus allowing bumpless transfer to load control mode.
3) The PLC energizes K_LCNTL.
4) The 'Load Reference' signal will ramp at a preset rate to the unload trip reference (5% of rated load).
5) Once the unload trip level has been achieved the PLC will send a VCB trip signal order—a preset timed open pulse.
6) When the PLC has positive feedback that VCB is open, the generator will be made available to the VMS by energizing K_PLCS', providing a 'Gen Set Ready' signal if all other conditions are met.
7) If at any point the 'Unload and Open' signal is removed, the system will open the K_LCNTL and the generator will immediately attempt to achieve droop speed control.
8) If any of the following conditions occur during the soft unload process, the PLC will de-energize K_LCNTL and drop the generator out of load control mode.
   d) the system monitors a load deviation (comparison between load reference output and calculated KW) exceeding a preset value for longer than a preset time delay.
   e) there is a deviation between the load reference and load reference feedback that exceeds a preset value for a preset time.
   f) the system bus frequency is higher or lower than the nominal frequency range of 59.25-60.75 Hz for longer than a preset time delay.

Comms Perfect

Each PLC monitors health status on the remainder of the Generator Protection PLCs and bases some additional, non critical functions on the status of this other elements in the system.
   These functions are:
   Single Gen Interlock
   Dead Bus Interlock Single Gen Interlock The program incorporates an interlock that disables the generator trips defined within this system in the event that the generator is the only generator left on the bus. This status is received from the Gen Pro Supervisory PLC. For this function to be active, the program must receive a 'Perfect Comms Bit' from supervisory PLC. This bit can only be high if all PLCs associated with the Gen Pro Sys are healthy and communicating with the Gen Pro Supervisory PLC. If communications are not 100% then the failure mode is for the system to keep all faults active.

Dead Bus Close Interlock

The program incorporates an additional function designed to stagger generator dead bus closure commands from each generator. The generator control system incorporates extensive protection to ensure that a generator can not be closed out of phase with the bus and to ensure that sensing of a dead bus condition is cannot be mis interpreted due to a single failure on the system.

The system however does not prevent 2 independent generators from attempting to recover from a dead bus condition in parallel—this is in fact the intent of the design.

This does however raise the remote possibility that 2 generators on the same bus will start at the same time, sense a dead bus at the same time and then issue a close order at the same time. Although the probability of this happening is extremely low, additional protection has been added to prevent synchronized closure attempts.

This function is active at each of the stand alone generator protection PLCs if the Perfect Comms bit is high' If comms are not perfect then the dedicated generator protection PLC will enable dead bus closure after the a time delay equal to the generator number (i.e. 1-7 seconds). This provides additional staggering in the event that two generators loose the perfect comms bit at the same time.

When the function is active the individual Generator Protection PLCs are passed a token from the Supervisory Gen Protection PLC to enable dead bus closure. This token is 2 seconds in duration and exclusive to one generator per bus at a time. If any of the stand alone generator protection PLCs do not receive a token within an eight second window, then the function times out and enables dead bus closure.

The system uses the K_SND relay to provide the close permissive to the SPM-D.

Intelligent Load Power Plant Protection

The Intelligent Load Portion of the Process increases the fault tolerance and reliability of a plant by defining a method of coordinated but independent power management to respond to conditions of stress on the connected bus.

With this process, intelligent loads that are heavy consumers can reduce their consumption based on measurement of bus frequency. The use of droop allows a load to know what the percentage of plant load is. A supervisory system can be used to coordinate the action of the intelligent loads but it is important that the load itself acts independently once it understands when and how it is to reduce load.

If a supervisory system provides coordination to intelligent loads then the loads can receive frequency and voltage set points to initiate load reduction (real or reactive) and a set point at which their load consumption is at a preprogrammed minimum value (this can be zero). Also a binary signal can be used to override the process for mission critical loads.

The important thing to note is that the load always responds to bus condition as an independent controller with the last parameters that it received for coordination or with its preprogrammed set point(s)—some systems will use a supervisory controller for coordination but this is not a requirement. With this process the load's response to bus condition can be immediate. None of the issues associated with data latency or missing data for power management functions are issues with this process design. This is a vast improvement over current power management systems and has a significant impact on overall plant reliability and casualty response.

This process is not possible without operating the plant in droop with no correction to the nominal value for frequency or voltage. This is currently not the practice for power plants.

The following are definitions for acronyms used in the present application:
2301D—Model name for a digital speed controller produced by Woodward
AG P—Advanced Generator Protection System
AVM—Automatic Vessel Management System
AVR—Automatic Voltage Regulator
DECS—Model name for a digital voltage controller produced by Basler
DSP—Digital Signal Processing
HMI—Human Machine Interface
HW—Hardware
KVAR—Kilovars, a measurement of reactive electrical power
KW—Kilowatts, a measurement of real electrical power Multilin—Model name for a protection relay produced by GE PLC—Programmable Logic Controller, where ever this acronym is used it can be substituted for any process controller that is able to carry the control functions defined—the process is independent of the hardware utilized SPM-D—Model name for a digital synchronized produced by Wooward SWBD—Switchboard VCB—Vacuum Circuit Breaker VMS—Vessel Management System With reference to FIG. 9, all critical controls and protection are pushed to the lowest control layer possible. Also, Interdependencies are removed fro critical control—each generator is set fully capable of autonomous operation for primary control and protection functions (no reliance on a supervisory system). Each generator has a dedicated AGP protection device.

A subsystem is illustrated comprising:
- a diesel control 80 which manages primary diesel control functions and provides information to the ICVS;
- a gen control 82, which itself includes a digital voltage regulator (AVR) such as a Basler DECS 200, a digital electronic governor (Gov) such as a Heinzman, Woodward 2301D, a protection relay 84 (trip) such as a GE SR489 Relay or Siprotec, and an advanced generator protection PLC (AGP);
- an IVCS (Integrated Vessel Control System) control 84 which includes an interface to diesel control and a generator control for visualization;
- an IVCS control 86 which includes a typical IVCS controls for power management and operator interface; and
- a generator supervisory system 88 which provides visualization of the generator controls and protection, and synchronizes the high speed logging.

An interface is illustrated comprising:
- a main gen VCB trip and status 90;
- a tie trip 92;
- generator process variables 94;
- bus process variables 96;
- diesel start/stop commands 98 (including emerg), fuel control, status;
- diesel start/stop commands 100 (including emerg), load/unload, open, start all, control system faults and alarms;
- system operating data and alarm status 102;
- system operating data and alarm status 104
- diesel start/stop commands 106
- data for high speed fault logging, all electrical operating parameters for logging and visualization 108;
- a field control and measured feedback for protection system 110; and
- a fuel control, measured feedback for protection and speed feedback system 112.

The invention claimed is:

1. A power plant comprising:
    a plurality of generators;
    at least one load;
    at least one bus interconnecting said generators with said at least one load;
    said plant being operated in an uncorrected droop configuration for speed control and voltage control;
    wherein:
    said plant further includes a monitoring module for monitoring at least one of a plurality of signals; a calculating module for calculating a fault based on a comparison of predefined values for frequency versus kilowatts and voltage versus kilovar expected from normal droop operation with respect to monitored values obtained from said monitored signals; and a control module for providing an order to bring additional generating capacity on line, for tripping a generator if a fault has been identified with respect to a single generator or for tripping a tie breaker to provide bus to bus isolation if an identified fault cannot be isolated to a single generator.

2. A plant according to claim 1, characterized in that said monitoring module is operatively connected to a bus measuring transducer, and in that said predefined values are based on constants for rated power and droop, and wherein said monitored values are speed and real power where a deviation from predefined expected values is indicative of a fault with the speed control function for an associated generator prime mover.

3. A plant according to claim 1, characterized in that said monitoring module is operatively connected to a voltage controller, and in that said predefined values are based on constants for rated reactive power or reactive current and droop, and wherein said monitored values are voltage and reactive power or reactive current where a deviation from predefined expected values is indicative of a fault with the voltage control function for the associated generator.

4. A plant according to claim 1, wherein at least one of said loads is further provided with a monitoring apparatus, said monitoring apparatus being operatively connected with said at least one load and operatively connected to said at least one bus, said monitoring apparatus monitoring frequency and voltage on said at least one bus and comparing said monitored frequency and voltage with predetermined levels expected from normal droop operation, and for modifying a contribution of said load to said plant as monitored frequency or voltage or a combination thereof approach boundary conditions for either of frequency and voltage.

5. A plant according to claim 1, wherein the operating mode utilizes uncorrected droop and wherein control elements within the system are able to determine the health of the measured values based on the droop curve for speed and voltage control.

6. A plant according to claim 1 wherein the operating mode utilizes uncorrected droop and wherein control elements within the system measure frequency and voltage, and are able carry out power management control functions based on the calculation of percent load based on the droop curves for real and reactive power only.

7. A power plant comprising:
    a plurality of generators;
    at least one load;
    at least one bus interconnecting said generators with said at least one load;
    said plant being operated on an uncorrected droop configuration for speed control and voltage control;
    wherein at least one of said loads is further provided with a monitoring apparatus, said monitoring apparatus being operatively connected with said at least one load and operatively connected to said at least one bus, said monitoring apparatus monitoring frequency and voltage on said at least one bus and comparing said monitored frequency and voltage with predetermined levels expected from normal droop operation, and for modifying a contribution of said load to said plant as monitored frequency or voltage or a combination thereof approach boundary conditions for either of frequency as it relates to percentage kilowatt load and voltage as it relates to percentage kilovar load.

8. A plant according to claim 7, wherein modifying said contribution of said load to said plant includes:
reducing real or reactive power consumption through internal control algorithms resulting in a corresponding reduction in machine output;
reducing regenerated power applied to the bus to prevent a load from overpowering the bus when conditions are approaching the upper limit of the load droop curve; and
measuring the percentage of real and reactive load by reactive load compensation equipment to allow correction and system operation at optimal levels.

9. A method for controlling the operation of a power plant comprising a plurality of generators; at least one load; at least one bus interconnecting said generators with said at least one load; wherein said method comprises the steps of:
operating said plant in an uncorrected droop configuration for speed control and voltage control;
monitoring at least one of a plurality of signals;
calculating a fault based on a comparison of predefined values for frequency versus kilowatts and voltage versus kilovar expected from normal droop operation with respect to monitored values obtained from said monitored signals; and
providing an order to bring additional generating capacity on line, for tripping a generator if a fault has been identified with respect to a single generator or for tripping a tie breaker to provide bus to bus isolation if an identified fault cannot be isolated to a single generator.

* * * * *